(12) United States Patent
Kim et al.

(10) Patent No.: US 10,791,571 B2
(45) Date of Patent: Sep. 29, 2020

(54) DOWNLINK SIGNAL RECEIVING METHOD AND USER EQUIPMENT, AND DOWNLINK SIGNAL TRANSMISSION METHOD AND BASE STATION

(71) Applicant: LG ELECTRONICS INC., Seoul (KR)

(72) Inventors: Eunsun Kim, Seoul (KR); Hyunsoo Ko, Seoul (KR); Kijun Kim, Seoul (KR); Joonkui Ahn, Seoul (KR); Suckchel Yang, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 28 days.

(21) Appl. No.: 16/096,612

(22) PCT Filed: Apr. 26, 2017

(86) PCT No.: PCT/KR2017/004460
§ 371 (c)(1),
(2) Date: Oct. 25, 2018

(87) PCT Pub. No.: WO2017/188734
PCT Pub. Date: Nov. 2, 2017

(65) Prior Publication Data
US 2019/0141733 A1  May 9, 2019

Related U.S. Application Data

(60) Provisional application No. 62/327,995, filed on Apr. 26, 2016, provisional application No. 62/472,542, filed on Mar. 16, 2017.

(51) Int. Cl.
*H04W 72/12* (2009.01)
*H04W 72/04* (2009.01)
*H04W 84/12* (2009.01)

(52) U.S. Cl.
CPC ... *H04W 72/1289* (2013.01); *H04W 72/0446* (2013.01); *H04W 84/12* (2013.01)

(58) Field of Classification Search
CPC ......... H04W 72/1289; H04W 72/0446; H04W 84/12
See application file for complete search history.

(56) References Cited

U.S. PATENT DOCUMENTS 9,191,925 B2 * 11/2015 Roessel ................. H04W 72/04
9,516,653 B2 * 12/2016 Yang .................... H04W 72/042
(Continued)

OTHER PUBLICATIONS

PCT International Application No. PCT/KR2017/004460, Written Opinion of the International Searching Authority dated Aug. 24, 2017, 23 pages.
(Continued)

*Primary Examiner* — Jay P Patel
(74) *Attorney, Agent, or Firm* — Lee, Hong, Degerman, Kang & Waimey

(57) ABSTRACT

First downlink scheduling information for a first subframe and second downlink scheduling information for a second subframe can be transmitted and received in the first subframe. A first type downlink data channel can be transmitted and received in the first subframe according to the first downlink scheduling information, and a second type downlink data channel can be transmitted and received in the second subframe according to the second downlink scheduling information. Each of the first subframe and the second subframe may comprise a downlink control region and a data region in a time domain. The first downlink scheduling information and the second downlink scheduling information can be transmitted and received in the downlink control region of the first subframe. The first type downlink data channel is transmitted and received in the data area of the first subframe, and the second type downlink data channel
(Continued)

(a)

(b)

(c)

can be transmitted and received in the downlink control region of the second subframe. The data area of the first subframe and the downlink control area of the second subframe can be continuous with each other.

12 Claims, 12 Drawing Sheets

(56) References Cited

U.S. PATENT DOCUMENTS

| | | | | |
|---|---|---|---|---|
| 10,516,460 | B2* | 12/2019 | Yang | H04W 72/04 |
| 2011/0243066 | A1* | 10/2011 | Nayeb Nazar | H04L 5/0055 |
| | | | | 370/328 |
| 2013/0039284 | A1* | 2/2013 | Marinier | H04L 5/001 |
| | | | | 370/329 |
| 2014/0105057 | A1* | 4/2014 | Liu | H04L 1/1861 |
| | | | | 370/252 |
| 2014/0211709 | A1* | 7/2014 | Guan | H04L 1/0026 |
| | | | | 370/329 |
| 2014/0233474 | A1* | 8/2014 | Wu | H04L 5/0016 |
| | | | | 370/329 |
| 2014/0301299 | A1 | 10/2014 | Wu | |
| 2015/0092563 | A1* | 4/2015 | Tabet | H04L 5/0044 |
| | | | | 370/241 |
| 2015/0201405 | A1* | 7/2015 | Liu | H04W 72/04 |
| | | | | 370/329 |
| 2015/0264708 | A1 | 9/2015 | Li et al. | |
| 2015/0319777 | A1* | 11/2015 | Seo | H04W 48/12 |
| | | | | 370/330 |
| 2015/0373675 | A1* | 12/2015 | Seo | H04W 72/14 |
| | | | | 370/280 |
| 2016/0043847 | A1* | 2/2016 | Horiuchi | H04W 72/0413 |
| | | | | 370/329 |
| 2016/0073384 | A1* | 3/2016 | Horiuchi | H04W 72/0406 |
| | | | | 370/329 |
| 2016/0119904 | A1* | 4/2016 | Feng | H04J 11/0079 |
| | | | | 370/329 |
| 2016/0302230 | A1* | 10/2016 | Novlan | H04B 17/318 |
| 2016/0337095 | A1* | 11/2016 | Horiuchi | H04W 72/1273 |
| 2017/0019889 | A1* | 1/2017 | Horiuchi | H04L 5/0048 |
| 2017/0223728 | A1* | 8/2017 | Luo | H04L 5/0053 |
| 2017/0303283 | A1* | 10/2017 | Ng | H04L 5/1469 |
| 2018/0213517 | A1* | 7/2018 | Wei | H04W 72/14 |
| 2019/0110332 | A1* | 4/2019 | Wikstrom | H04W 76/28 |
| 2019/0174523 | A1* | 6/2019 | Wang | H04W 56/0015 |
| 2019/0261403 | A1* | 8/2019 | Sumasu | H04L 5/0053 |
| 2019/0274124 | A1* | 9/2019 | Guan | H04L 5/0053 |
| 2019/0289605 | A1* | 9/2019 | Futaki | H04W 72/12 |
| 2019/0393995 | A1* | 12/2019 | Noh | H04L 5/14 |
| 2020/0015211 | A1* | 1/2020 | Horiuchi | H04W 72/0446 |

OTHER PUBLICATIONS

ZTE, "Frame structure design of new RAT", 3GPP TSG RAN WG1 Meeting #84bis, R1-162228, Apr. 2016, 6 pages.
Lenovo, "Frame structure design for next radio interface", 3GPP TSG RAN WG1 Meeting #84bis, R1-162742, Apr. 2016, 3 pages.
Nokia, et al., "Basic frame structure principles for 5G new radio", 3GPP TSG RAN WG1 Meeting #84bis, R1-162893, Apr. 2016, 7 pages.

* cited by examiner

DOWNLINK SIGNAL RECEIVING METHOD AND USER EQUIPMENT, AND DOWNLINK SIGNAL TRANSMISSION METHOD AND BASE STATION

CROSS-REFERENCE TO RELATED APPLICATIONS

This application is the National Stage filing under 35 U.S.C. 371 of International Application No. PCT/KR2017/004460, filed on Apr. 26, 2017, which claims the benefit of U.S. Provisional Application No. 62/327,995, filed on Apr. 26, 2016 and 62/472,542, filed on Mar. 16, 2017, the contents of which are all hereby incorporated by reference herein in their entirety.

TECHNICAL FIELD

The present invention relates to a wireless communication system, and more particularly, to methods and devices for transmitting/receiving downlink signals.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

As more communication devices have demanded higher communication capacity, there has been necessity of enhanced mobile broadband (eMBB) relative to legacy radio access technology (RAT). In addition, massive machine type communication (mMTC) for providing various services at any time and anywhere by connecting a plurality of devices and objects to each other is one main issue to be considered in next generation communication.

Further, a communication system to be designed in consideration of a service/UE sensitive to reliability and standby time is under discussion. Introduction of next generation radio access technology has been discussed by taking into consideration eMBB communication, mMTC, ultra-reliable and low-latency communication (URLLC), and the like.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, with development of smart devices, a new scheme for efficiently transmitting/receiving a small amount of data or efficiently transmitting/receiving data occurring at a low frequency is required.

In addition, a signal transmission/reception method is required in the system supporting new radio access technologies.

The technical objects that can be achieved through the present invention are not limited to what has been particularly described hereinabove and other technical objects not described herein will be more clearly understood by persons skilled in the art from the following detailed description.

Technical Solution

According to an aspect of the present invention, provided herein is a method of receiving a downlink (DL) signal by a user equipment (UE). The method includes: receiving first DL scheduling information for a first subframe and second DL scheduling information for a second subframe in the first subframe; and receiving a first type DL data channel in the first subframe according to the first DL scheduling information and receiving a second type DL data channel in the second subframe according to the second DL scheduling information. Each of the first subframe and the second subframe may include a DL control region and a data region in a time domain. The first DL scheduling information and the second DL scheduling information may be received in the DL control region of the first subframe. The first type DL data channel may be received in the data region of the first subframe. The second type DL data channel may be received in the DL control region of the second subframe. The data region of the first subframe and the DL control region of the second subframe are consecutive.

According to another aspect of the present invention, provided herein is a user equipment (UE) for receiving a downlink (DL) signal. The UE includes a radio frequency, and a processor configured to control the RF unit. The processor may: control the RF unit to receive first DL scheduling information for a first subframe and second DL scheduling information for a second subframe in the first subframe; and control the RF unit to receive a first type DL data channel in the first subframe according to the first DL scheduling information and receive a second type DL data channel in the second subframe according to the second DL scheduling information. Each of the first subframe and the second subframe may include a DL control region and a data region in a time domain. The processor may control the RF unit to receive the first DL scheduling information and the second DL scheduling information in the DL control region of the first subframe, control the RF unit to receive the first type DL data channel in the data region of the first subframe, and control the RF unit to receive the second type DL data channel in the DL control region of the second subframe. The data region of the first subframe and the DL control region of the second subframe are consecutive.

According to another aspect of the present invention, provided herein is a method of transmitting a downlink (DL) signal by a base station (BS). The method includes: transmitting first DL scheduling information for a first subframe and second DL scheduling information for a second subframe in the first subframe; and transmitting a first type DL data channel in the first subframe according to the first DL scheduling information and transmitting a second type DL data channel in the second subframe according to the second DL scheduling information. Each of the first subframe and the second subframe may include a DL control region and a data region in a time domain. The first DL scheduling information and the second DL scheduling information may be transmitted in the DL control region of the first subframe. The first type DL data channel may be transmitted in the data region of the first subframe. The second type DL data channel may be transmitted in the DL control region of the second subframe. The data region of the first subframe and the DL control region of the second subframe are consecutive.

According to another aspect of the present invention, provided herein is a base station (BS) for transmitting a downlink (DL) signal. The BS includes a radio frequency, and a processor configured to control the RF unit. The processor may: control the RF unit to transmit first DL scheduling information for a first subframe and second DL scheduling information for a second subframe in the first subframe; and control the RF unit to transmit a first type DL data channel in the first subframe according to the first DL scheduling information and transmit a second type DL data channel in the second subframe according to the second DL scheduling information. Each of the first subframe and the second subframe may include a DL control region and a data region in a time domain. The first DL scheduling information and the second DL scheduling information may be transmitted in the DL control region of the first subframe. The first type DL data channel may be transmitted in the data region of the first subframe and the second type DL data channel may be transmitted in the DL control region of the second subframe. The data region of the first subframe and the DL control region of the second subframe are consecutive.

The above technical solutions are merely some parts of the embodiments of the present invention and various embodiments into which the technical features of the present invention are incorporated can be derived and understood by persons skilled in the art from the following detailed description of the present invention.

Advantageous Effect

According to the present invention, uplink/downlink signals can be efficiently transmitted/received. Therefore, overall throughput of a radio communication system can be improved.

According to an embodiment of the present invention, delay/latency occurring during communication between a user equipment and a base station may be reduced.

In addition, owing to development of smart devices, it is possible to efficiently transmit/receive not only a small amount of data but also data which occurs infrequently.

Moreover, signals can be transmitted/received in the system supporting new radio access technologies.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

MODE FOR INVENTION

Figure 1:
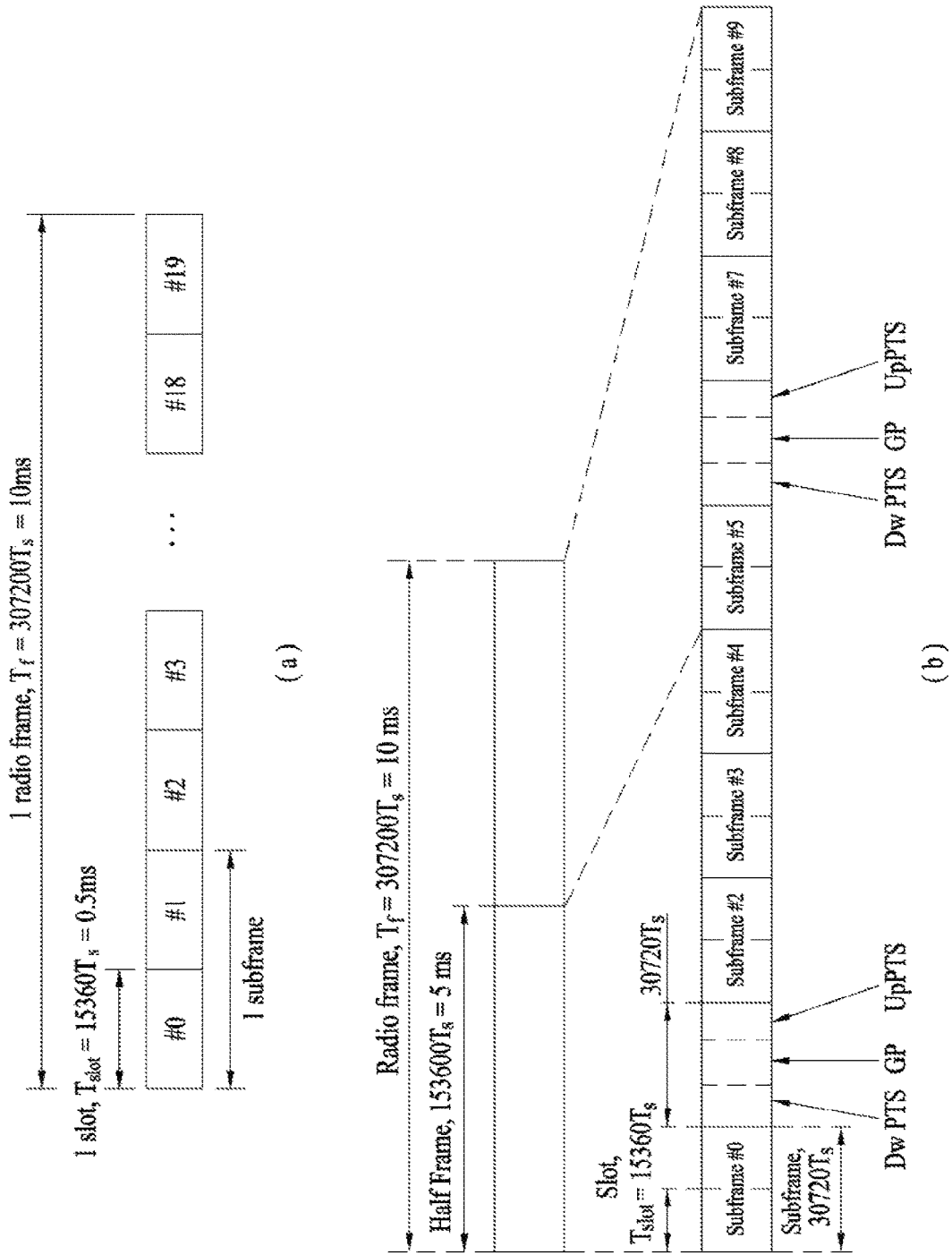
FIG. 1 illustrates the structure of a radio frame used in the LTE/LTE-A based wireless communication system.

Reference will now be made in detail to the examples of the present invention, examples of which are illustrated in the accompanying drawings. The detailed description, which will be given below with reference to the accompanying drawings, is intended to explain examples of the present invention, rather than to show the only examples that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmitting device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmitting devices always sense carrier of a network and, if the network is empty, the transmitting devices wait for determined time according to locations thereof registered in a list and then transmit data. Various methods are used to determine priority of the transmitting devices in the list and to reconfigure priority. In a system according to some versions of IEEE 802.11 standards, collision may occur and, in this case, a collision sensing procedure is performed. A transmitting device using CSMA/CA avoids collision between data transmission thereof and data transmission of another transmitting device using a specific rule.

In examples of the present invention described below, the term "assume" may mean that a subject to transmit a channel transmits the channel in accordance with the corresponding "assumption". This may also mean that a subject to receive the channel receives or decodes the channel in a form conforming to the "assumption", on the assumption that the channel has been transmitted according to the "assumption".

In the present invention, puncturing a channel on a specific resource means that the signal of the channel is mapped to the specific resource in the procedure of resource mapping of the channel, but a portion of the signal mapped to the punctured resource is excluded in transmitting the channel. In other words, the specific resource which is punctured is counted as a resource for the channel in the procedure of resource mapping of the channel, a signal mapped to the specific resource among the signals of the channel is not actually transmitted. The receiver of the channel receives, demodulates or decodes the channel, assuming that the signal mapped to the specific resource is not transmitted. On the other hand, rate-matching of a channel on a specific resource means that the channel is never mapped to the specific resource in the procedure of resource mapping of the channel, and thus the specific resource is not used for transmission of the channel. In other words, the rate-matched resource is not counted as a resource for the channel in the procedure of resource mapping of the channel. The receiver of the channel receives, demodulates, or decodes the channel, assuming that the specific rate-matched resource is not used for mapping and transmission of the channel.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. The UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Detailed CSI-RS configuration may be understood with reference to 3GPP TS 36.211 and 3GPP TS 36.331 documents.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP LTE-A standard uses the concept of a cell to manage radio resources. The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). The carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE- RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present invention, both a DMRS and a UE-RS refer to RSs for demodulation and, therefore, the terms DMRS and UE-RS are used to refer to RSs for demodulation.

For terms and technologies which are not specifically described among the terms of and technologies employed in this specification, 3GPP LTE/LTE-A standard documents, for example, 3GPP TS 36.211, 3GPP TS 36.212, 3GPP TS 36.213, 3GPP TS 36.321 and 3GPP TS 36.331 may be referenced.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIG. 1, a 3GPP LTE/LTE-A radio frame is 10 ms (307,200$T_s$) in duration. The radio frame is divided into 10 subframes of equal size. Subframe numbers may be assigned to the 10 subframes within one radio frame, respectively. Here, $T_s$ denotes sampling time where $T_s$=1/(2048*15 kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A TTI refers to an interval at which data may be scheduled. For example, the transmission opportunity of a UL grant or DL grant is given every 1 ms in the current LTE/LTE-A system. The UL/DL grant opportunity is not given several times within a time shorter than 1 ms. Accordingly, the TTI is 1 ms in the current LTE-LTE-A system.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Figure 2:
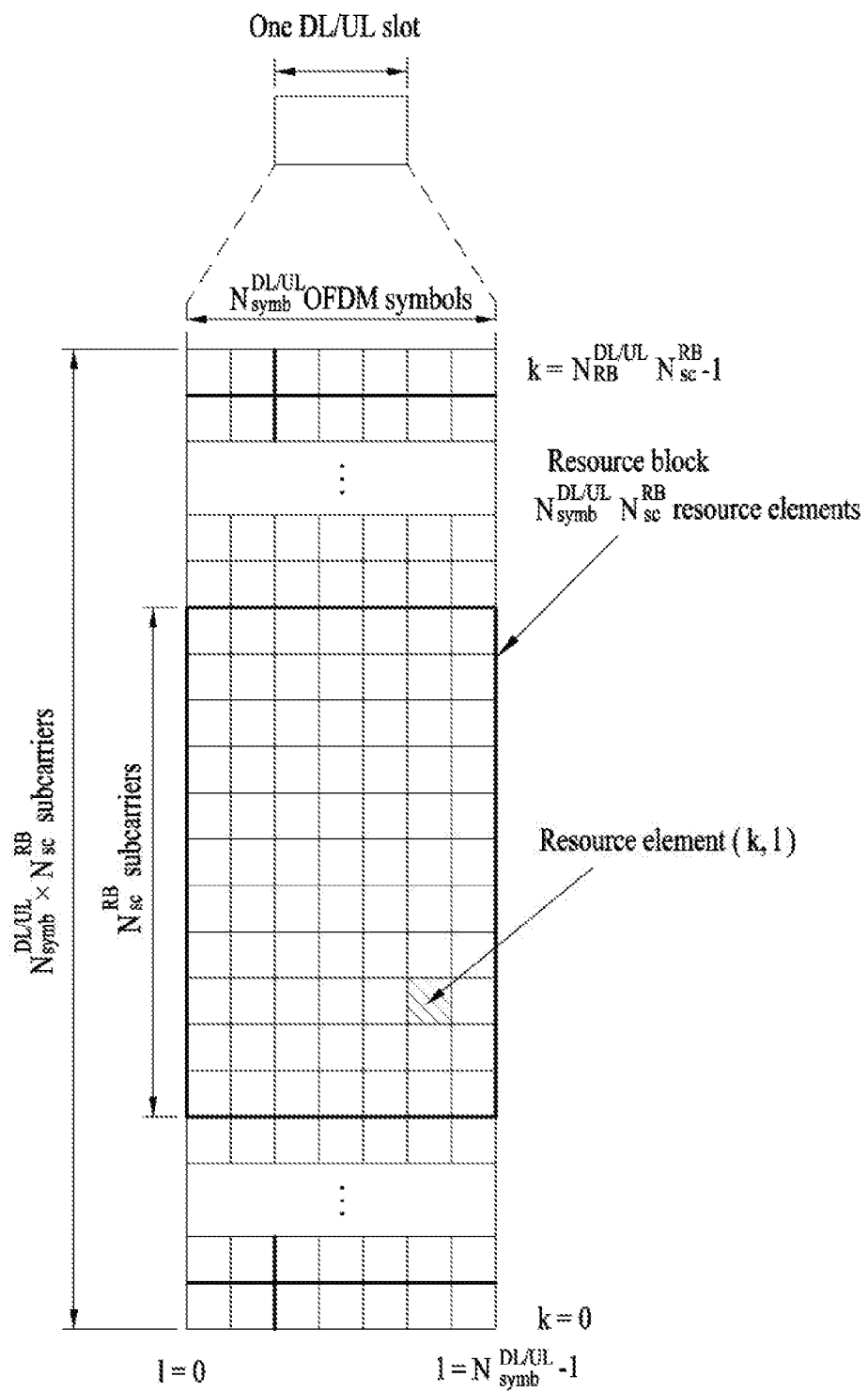
FIG. 2 illustrates the structure of a downlink (DL)/uplink (UL) slot in the LTE/LTE-A based wireless communication system.

FIG. 2 illustrates the structure of a DL/UL slot structure in the LTE/LTE-A based wireless communication system.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, examples of the present invention are similarly applicable to subframes having a different number of OFDM symbols. Referring to FIG. 2, each OFDM symbol includes $N^{DL/UL}_{RB} * N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

Figure 3:
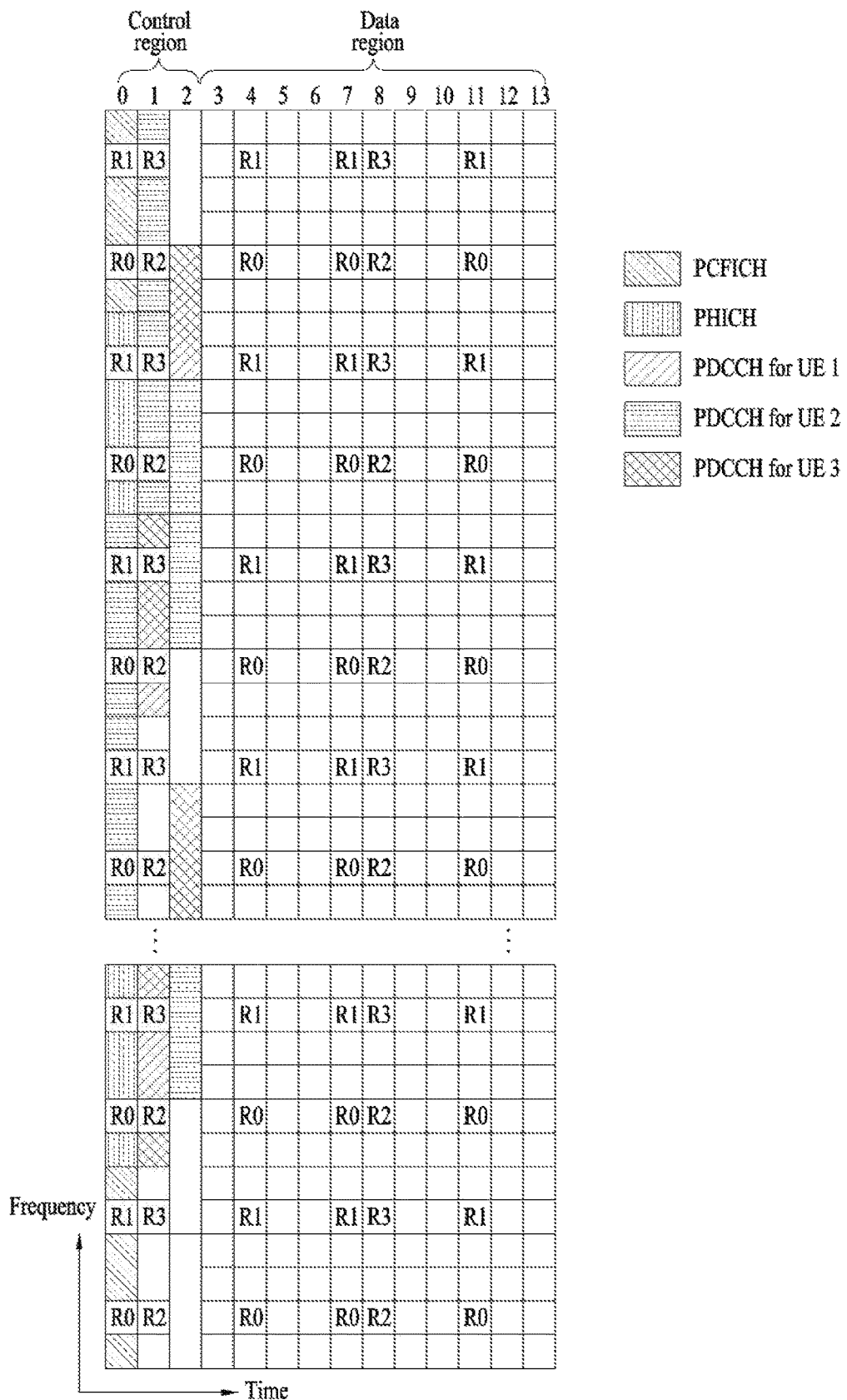
FIG. 3 illustrates the structure of a DL subframe used in the LTE/LTE-A based wireless communication system.

FIG. 3 illustrates the structure of a DL subframe used in the LTE/LTE-A based wireless communication system.

Referring to FIG. 3, a DL subframe is divided into a control region and a data region in the time domain. Referring to FIG. 3, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region.

Examples of a DL control channel used in 3GPP LTE include a physical control format indicator channel (PCFICH), a physical downlink control channel (PDCCH), a physical hybrid ARQ indicator channel (PHICH), etc.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, each CCE includes nine REGs, and the nine REGs are distributed over first one/two/three OFDM symbols (or four OFDM symbols if necessary for 1.4 MHz) and over the system bandwidth in order to mitigate interference for the purpose of diversity. One REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH).

Figure 4:
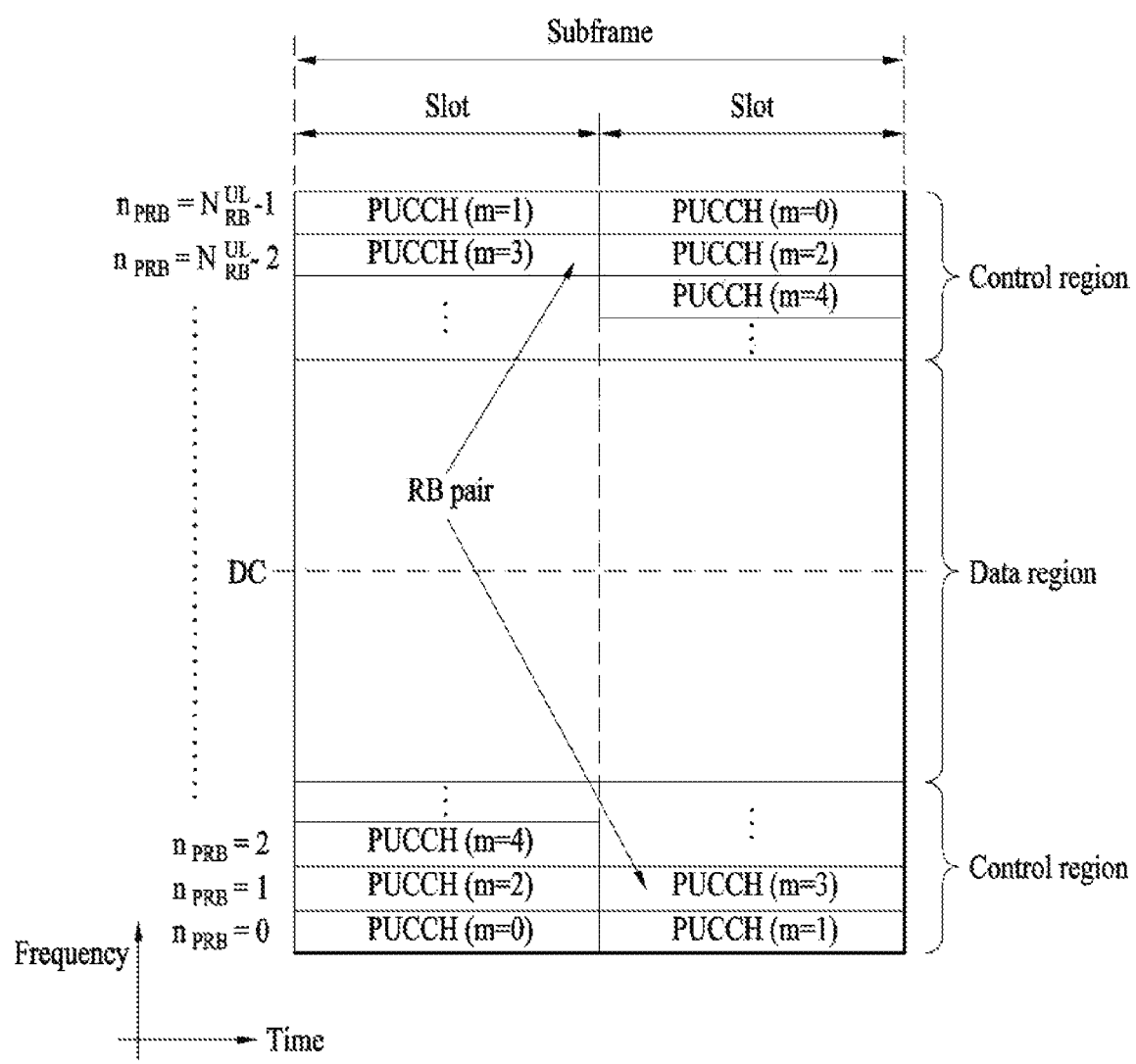
FIG. 4 illustrates the structure of a UL subframe used in the LTE/LTE-A based wireless communication system.

FIG. 4 illustrates the structure of a UL subframe used in the LTE/LTE-A based wireless communication system.

Referring to FIG. 4, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

When considering the usage of the MTC UE, there is a high probability that the MTC UE requires a signal of wide coverage compared with the legacy UE. Therefore, if the eNB transmits a PDCCH, a PDSCH, etc. to the MTC UE using the same scheme as a scheme of transmitting the PDCCH, the PDSCH, etc. to the legacy UE, the MTC UE has difficulty in receiving the PDCCH, the PDSCH, etc. Therefore, the present invention proposes that the eNB apply a coverage enhancement scheme such as subframe repetition (repetition of a subframe with a signal) or subframe bundling upon transmission of a signal to the MTC UE having a coverage issue so that the MTC UE can effectively receive a signal transmitted by the eNB. For example, the PDCCH and/or the PDSCH may be transmitted to the MTC UE having the coverage issue through multiple (e.g., about 100) subframes.

The examples of the present invention can be applied to not only the 3GPP LTE/LTE-A system but also a new radio access technology (RAT) system. As a number of communication devices have required much higher communication capacity, the necessity of mobile broadband communication, which is much enhanced compared to the conventional RAT, has increased. In addition, massive MTC capable of providing various services anytime and anywhere by connecting a number of devices or things to each other has been considered as a main issue in the next generation communication system. Moreover, the design of a communication system capable of supporting services/UEs sensitive to reliability and latency has also been discussed. That is, the introduction of the next generation RAT considering the enhanced mobile broadband communication, massive MTC, Ultra-reliable and low latency communication (URLLC), etc. has been discussed. For convenience of description, the corresponding technology is simply referred to as a new RAT in this specification.

In the next system of LTE-A, a method to reduce latency of data transmission is considered. Packet data latency is one of the performance metrics that vendors, operators and also end-users (via speed test applications) regularly measure. Latency measurements are done in all phases of a radio access network system lifetime, when verifying a new software release or system component, when deploying a system and when the system is in commercial operation.

Better latency than previous generations of 3GPP RATs was one performance metric that guided the design of LTE. LTE is also now recognized by the end-users to be a system that provides faster access to internet and lower data latencies than previous generations of mobile radio technologies.

However, with respect to further improvements specifically targeting the delays in the system little has been done. Packet data latency is important not only for the perceived responsiveness of the system; it is also a parameter that indirectly influences the throughput. HTTP/TCP is the dominating application and transport layer protocol suite used on the internet today. According to HTTP Archive (http://httparchive.org/trends.php) the typical size of HTTP-based transactions over the internet are in the range from a few 10's of Kbytes up to 1 Mbyte. In this size range, the TCP slow start period is a significant part of the total transport period of the packet stream. During TCP slow start the performance is latency limited. Hence, improved latency can rather easily be shown to improve the average throughput, for this type of TCP-based data transactions. In addition, to achieve really high bit rates (in the range of Gbps), UE L2 buffers need to be dimensioned correspondingly. The longer the round trip time (RTT) is, the bigger the buffers need to be. The only way to reduce buffering requirements in the UE and eNB side is to reduce latency.

Radio resource efficiency could also be positively impacted by latency reductions. Lower packet data latency could increase the number of transmission attempts possible within a certain delay bound; hence higher block error ration (BLER) targets could be used for the data transmissions, freeing up radio resources but still keeping the same level of robustness for users in poor radio conditions. The increased number of possible transmissions within a certain delay bound, could also translate into more robust transmissions of real-time data streams (e.g. VoLTE), if keeping the same BLER target. This would improve the VoLTE voice system capacity.

There are more over a number of existing applications that would be positively impacted by reduced latency in terms of increased perceived quality of experience: examples are gaming, real-time applications like VoLTE/OTT VoIP and video telephony/conferencing.

Going into the future, there will be a number of new applications that will be more and more delay critical. Examples include remote control/driving of vehicles, augmented reality applications in e.g. smart glasses, or specific machine communications requiring low latency as well as critical communications.

Figure 5:
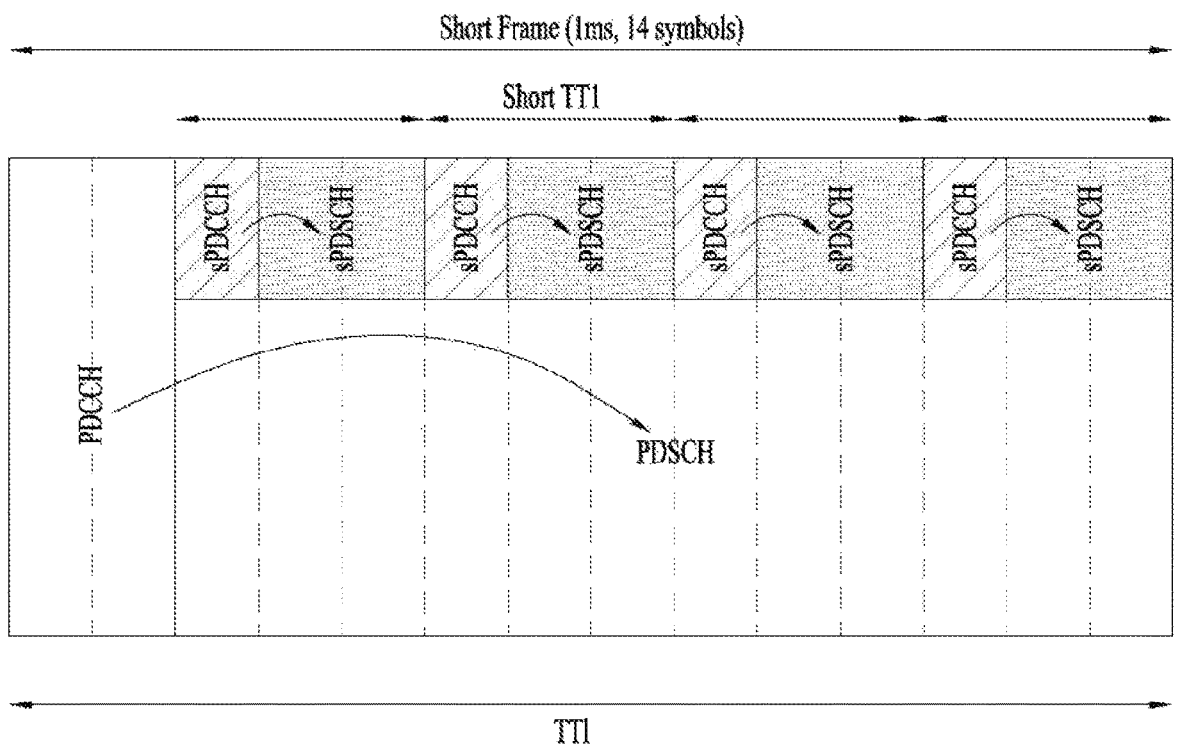
FIG. 5 illustrates an example of a short transmission time interval (TTI) and a transmission example of a control channel and a data channel in the short TTI.

FIG. 5 illustrates an example of a short TTI and a transmission example of a control channel and a data channel in the short TTI.

To reduce a user plane (U-plane) latency to 1 ms, a shortened TTI (sTTI) shorter than 1 ms may be configured. For example, for the normal CP, an sTTI consisting of 2 OFDM symbols, an sTTI consisting of 4 OFDM symbols and/or an sTTI consisting of 7 OFDM symbols may be configured.

In the time domain, all OFDM symbols constituting a default TTI or the OFDM symbols except the OFDM symbols occupying the PDCCH region of the TTI may be divided into two or more sTTIs on some or all frequency resources in the frequency band of the default TTI.

In the following description, a default TTI or main TTI used in the system is referred to as a TTI or subframe, and the TTI having a shorter length than the default/main TTI of the system is referred to as an sTTI. For example, in a system in which a TTI of 1 ms is used as the default TTI as in the current LTE/LTE-A system, a TTI shorter than 1 ms may be referred to as the sTTI. The method of transmitting/receiving a signal in a TTI and an sTTI according to embodiments described below is applicable not only to the system according to the current LTE/LTE-A numerology but also to the default/main TTI and sTTI of the system according to the numerology for the new RAT environment.

In the downlink environment, a PDCCH for transmission/scheduling of data within an sTTI (i.e., sPDCCH) and a PDSCH transmitted within an sTTI (i.e., sPDSCH) may be transmitted. For example, referring to FIG. 5, a plurality of the sTTIs may be configured within one subframe, using different OFDM symbols. For example, the OFDM symbols in the subframe may be divided into one or more sTTIs in the time domain. OFDM symbols constituting an sTTI may be configured, excluding the leading OFDM symbols on which the legacy control channel is transmitted. Transmission of the sPDCCH and sPDSCH may be performed in a TDM manner within the sTTI, using different OFDM symbol regions. In an sTTI, the sPDCCH and sPDSCH may be transmitted in an FDM manner, using different regions of PRB(s)/frequency resources.

<OFDM Numerology>

The new RAT system uses an OFDM transmission scheme or a similar transmission scheme. For example, the new RAT system may follow the OFDM parameters defined in the following table.

TABLE 1

| Parameter | Value |
| --- | --- |
| Subcarrier-spacing (Δf) | 75 kHz |
| OFDM symbol length | 13.33 us |
| Cyclic Prefix (CP) length | 1.04 us/0/94 us |
| System BW | 100 MHz |
| No. of available subcarriers | 1200 |
| Subframe length | 0.2 ms |
| Number of OFDM symbol per Subframe | 14 symbols |

<Analog Beamforming>

In millimeter wave (mmW), the wavelength is shortened, and thus a plurality of antenna elements may be installed in the same area. For example, a total of 100 antenna elements may be installed in a 5-by-5 cm panel in a 30 GHz band with a wavelength of about 1 cm in a 2-dimensional array at intervals of 0.5λ, (wavelength). Therefore, in mmW, increasing the coverage or the throughput by increasing the beamforming (BF) gain using multiple antenna elements is taken into consideration.

If a transceiver unit (TXRU) is provided for each antenna element to enable adjustment of transmit power and phase, independent beamforming is possible for each frequency resource. However, installing TXRU in all of the about 100 antenna elements is less feasible in terms of cost. Therefore, a method of mapping a plurality of antenna elements to one TXRU and adjusting the direction of a beam using an analog phase shifter is considered. This analog beamforming method may only make one beam direction in the whole band, and thus may not perform frequency selective beamforming (BF), which is disadvantageous.

Hybrid BF with B TXRUs that are fewer than Q antenna elements as an intermediate form of digital BF and analog BF may be considered. In the case of hybrid BF, the number of directions in which beams may be transmitted at the same time is limited to B or less, which depends on the method of collection of B TXRUs and Q antenna elements.

<Self-Contained Subframe Structure>

Figure 6:
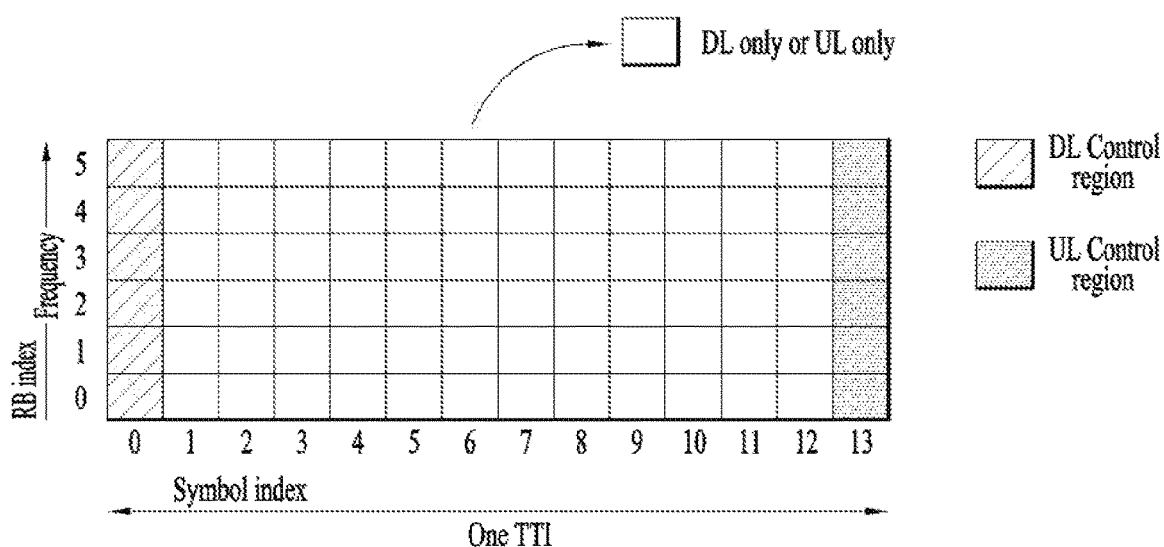
FIG. 6 illustrates a self-contained subframe structure.

FIG. 6 illustrates a self-contained subframe structure.

To minimize data transmission latency, a self-contained subframe structure in which a control channel and a data channel are time-division-multiplexed (TDMed) is considered in 5G new RAT.

In FIG. 6, the hatched area represents the transmission region of a DL control channel (e.g., PDCCH) carrying the DCI, and the black area represents the transmission region of a UL control channel (e.g., PUCCH) carrying the UCI. Here, the DCI is control information that the eNB transmits to the UE. The DCI may include information on cell configuration that the UE should know, DL specific information such as DL scheduling, and UL specific information such as UL grant. The UCI is control information that the UE transmits to the eNB. The UCI may include a HARQ ACK/NACK report on the DL data, a CSI report on the DL channel status, and a scheduling request (SR).

In FIG. 6, the region of symbols from symbol index 1 to symbol index 12 may be used for transmission of a physical channel (e.g., a PDSCH) carrying downlink data, or may be used for transmission of a physical channel (e.g., PUSCH) carrying uplink data. According to the self-contained subframe structure, DL transmission and UL transmission may be sequentially performed in one subframe, and thus transmission/reception of DL data and reception/transmission of UL ACK/NACK for the DL data may be performed in one subframe. As a result, the time taken to retransmit data when a data transmission error occurs may be reduced, thereby minimizing the latency of final data transmission.

In such a self-contained subframe structure, a time gap is needed for the process of switching from the transmission mode to the reception mode or from the reception mode to the transmission mode of the eNB and UE. On behalf of the process of switching between the transmission mode and the reception mode, some OFDM symbols at the time of switching from DL to UL in the self-contained subframe structure are set as a guard period (GP).

In a legacy LTE/LTE-A system, the DL control channel is TDMed with the data channel (refer to FIG. 3) and the PDCCH, which is the control channel, is distributively transmitted throughout an entire system band. However, in the new RAT, it is expected that the bandwidth of one system reaches approximately a minimum of 100 MHz and it is difficult to distributively transmit the control channel throughout the entire band. For data transmission/reception, if the UE monitors the entire band to receive the DL control channel, this may cause increase in battery consumption of the UE and deterioration in efficiency. Accordingly, the present invention proposes a scheme of locally or distributively transmitting the DL control channel in a partial frequency band within a system band, i.e., within a channel band.

Figure 7:
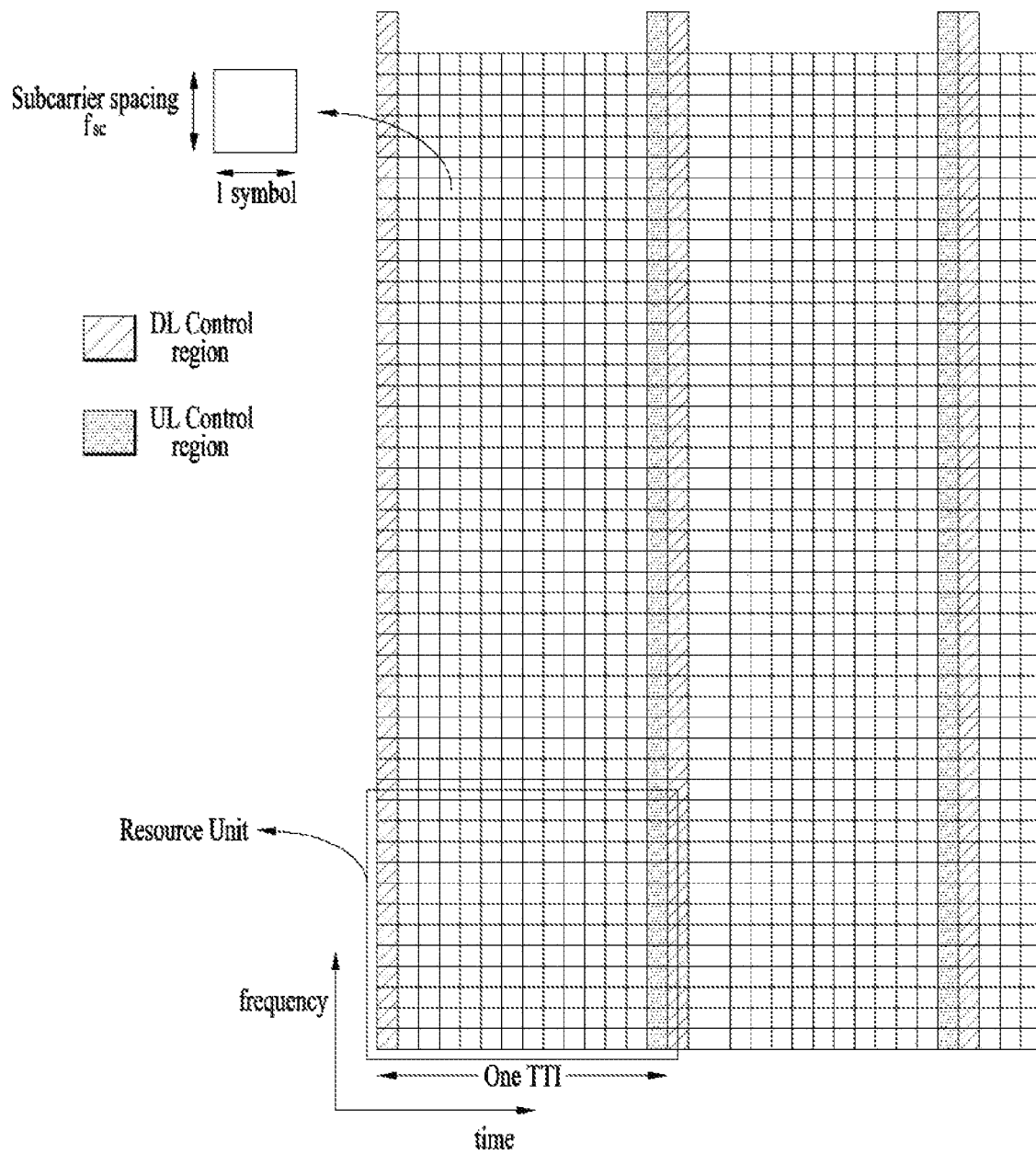
FIG. 7 illustrates a part of a radio frame based on a subframe structure in which a data channel and a control channel are time-division-multiplexed.

FIG. 7 illustrates a part of a radio frame based on a subframe structure in which a data channel and a control channel are TDMed.

Referring to FIG. 7, in a wideband system, a DL control channel can be Time Division Multiplexed (TDMed) with DL data or UL data and then transmitted. In this case, although an eNB may transmit a DL control channel(s) over the entire band, one UE may receive its DL control channel in specific partial band rather than the entire band. In this case, the DL control channel corresponding to information transmitted from the eNB to the UE may contain not only DL specific information such as DL scheduling but also information on a cell configuration and UL specific information such as UL grant.

As illustrated in FIG. 7, a basic resource unit (RU) for DL/UL scheduling may be defined even in a new RAT system as well as in the legacy LTE system. A plurality of OFDM symbols is included in the time domain and a plurality of subcarriers is included in the frequency domain. The basic RU may be defined with different sizes in UL and DL. The eNB may perform DL/UL data scheduling for the UE in units of RUs, i.e., in units of RUs of an integer. In FIG. 7, one box of a time-frequency resource grid, i.e., one subcarrier of one OFDM symbol length, may be defined as a resource element (RE).

For example, it is expected that the new RAT system, which is called the mmWave system or 5G system, will use wide system bandwidth. Specifically, depending on the frequency band, the minimum system bandwidth of 5 MHz, 10 MHz, 40 MHz, 80 MHz, etc. should be able to be supported. The minimum system band may vary according to the basic subcarrier spacing. For example, when the basic subcarrier spacing is respectively set to 15 kHz, 30 kHz, 120 kHz, and 240 kHz, the minimum system band may be 5 MHz, 10 MHz, 40 MHz, and 80 MHz, respectively. For example, the new RAT system is designed such that it operates on not only 6 GHz or less but 6 GHz or more and a plurality of subcarrier spacings are used in one system to support various scenarios and use cases. When the subcarrier spacing is changed, the length of a subframe can increase/decrease according to the change in the subcarrier spacing. For example, one subframe may be defined to have a short time period, for example, 0.5 ms, 0.25 ms, 0.125 ms, etc. It is expected that the new RAT system will use high frequency band (e.g., 6 GHz or higher) and support a subcarrier spacing greater than 15 kHz, i.e., the subcarrier spacing of the conventional LTE system. Assuming that the subcarrier spacing is 60 kHz, one resource unit (RU) can be defined as twelve subcarriers in the frequency domain and one subframe in the time domain.

<Configuration Scheme of Control Channel>

Figure 8:
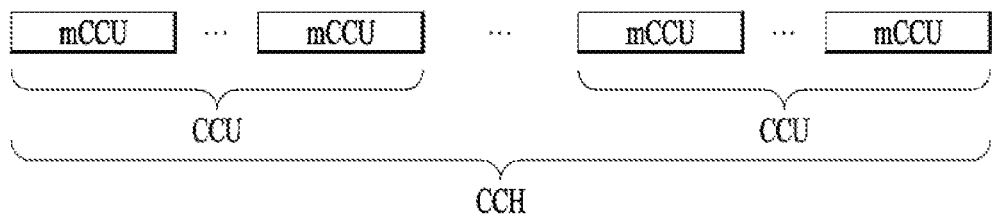
FIG. 8 illustrates the structure of resources for configuring a control channel.

FIG. 8 illustrates the structure of resources for configuring a control channel.

Similarly to defining the basic unit for data scheduling as the RU, a basic unit for control information may be defined. The basic unit for configuring the control information may be defined as a control channel unit (CCU). One CCU consists of one or more mini-CCUs (mCCUs). An mCCU may be defined as a set of specific N REs (where N≥1). That is, the mCCU is defined as a set of N REs and one or more mCCUs may constitute one CCU. When one CCU consists of one mCCU, the CCU includes a set of specific N REs. One or more CCUs may constitute one meaningful control channel (CCH). The meaning of "one meaningful CCH" represents that meaningful information may be transmitted through one CCH and one CCH may be used to transmit specific information in a cell or to UE(s) or instruct the UE(s) to perform a specific behavior.

One CCH may be distributively transmitted over a wide frequency band or locally transmitted over a specific frequency band. That is, when one CCH is mapped to a time-frequency region, a level at which the CCH is distributed or localized on the frequency axis may be defined and a distributed or localized unit on the frequency axis may be a CCH, a CCU, or an mCCU.

Hereinafter, schemes of mapping the CCH to the frequency axis will be described.

Scheme 1: CCH Localized Mapping

Figure 9:
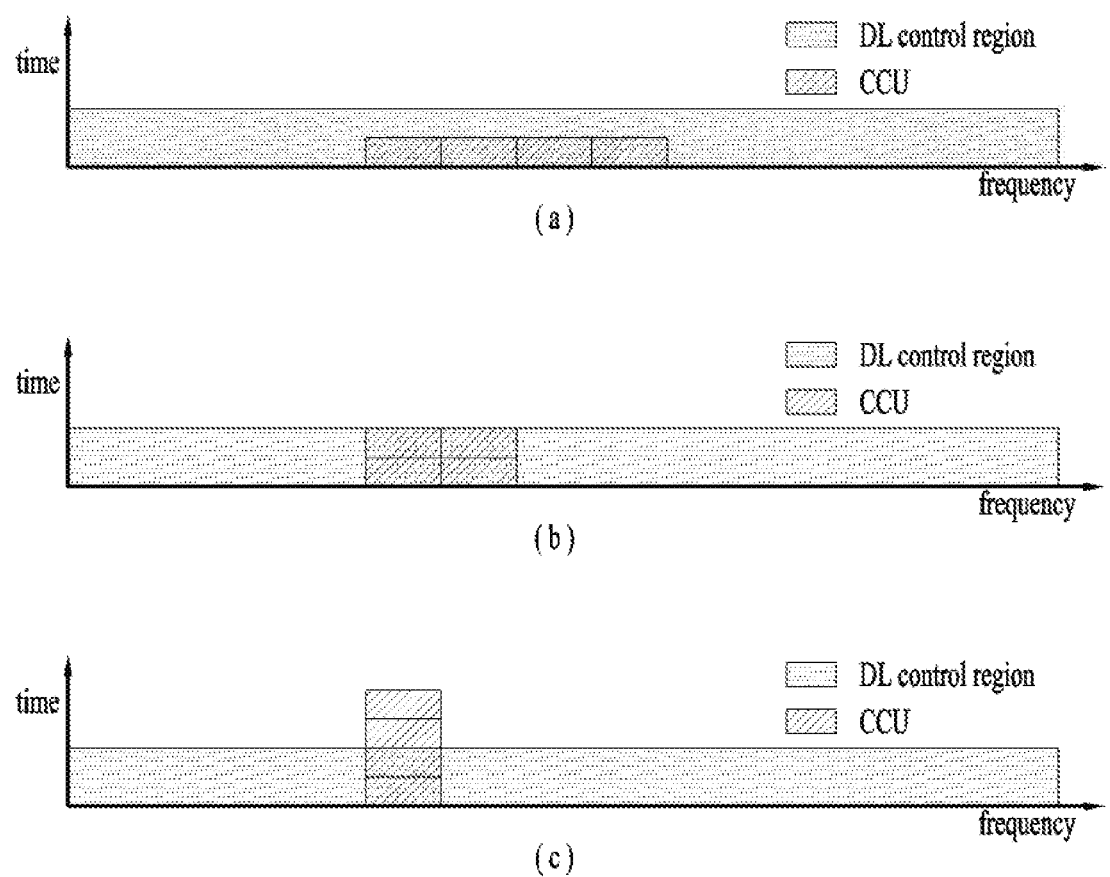
FIG. 9 illustrates examples of a control channel mapping scheme according to the present invention.

FIG. 9 illustrates examples of a control channel mapping scheme according to the present invention.

One CCH is all localized in a specific frequency axis and all REs constituting a CCU and an mCCU are adjacently mapped.

In Scheme 1, while diversity gain is hardly obtained because the CCH is locally transmitted in a specific band, dedicated beamforming may be performed to transmit the CCH. Furthermore, the localized CCH has an advantage of reducing RS overhead when CCUs are stacked on the time axis for mapping as illustrated in FIG. 9(b) or 9(c) rather than when the CCUs are mapped to the frequency axis as illustrated in FIG. 9(a). For example, when a plurality of localized CCUs constitute one CCH, dedicated beamforming gain may be maximized by first mapping the localized CCUs to the time axis rather than to the frequency axis. For example, assuming that one RS is needed per 6 REs due to a coherence frequency on the frequency axis, if a CCH is mapped to CCUs configured by stacking REs on the time axis under the condition that one RS is needed per RE on the frequency axis, the length of two or three symbols is within a coherence time and thus RSs need not be additionally used on the time axis. For example, if RS overhead caused by CCH mapping of FIG. 9(a) is 1, then RS overhead caused by CCH mapping of FIG. 9(b) may be reduced to ½ and RS overhead caused by CCH mapping of FIG. 9(c) may be reduced to ¼. Although diversity gain may be further obtained by distributing CCUs, it may be better to first map the CCUs constituting the CCH to the frequency axis as illustrated in FIG. 9(a). Such a frequency axis first mapping scheme may also be applied to a distributed mapping scheme which will be described later.

In Scheme 1, when a DL control channel and a data channel are multiplexed, a sort of self-contained control channel in which a DL control channel of a UE is also transmitted on a resource on which DL/UL data of the UE is transmitted may be designed. In Scheme 1, since the control channel of one UE is localized in a specific frequency band, it is desirable to use a dedicated RS as an RS for the control channel of the UE.

Figure 10:
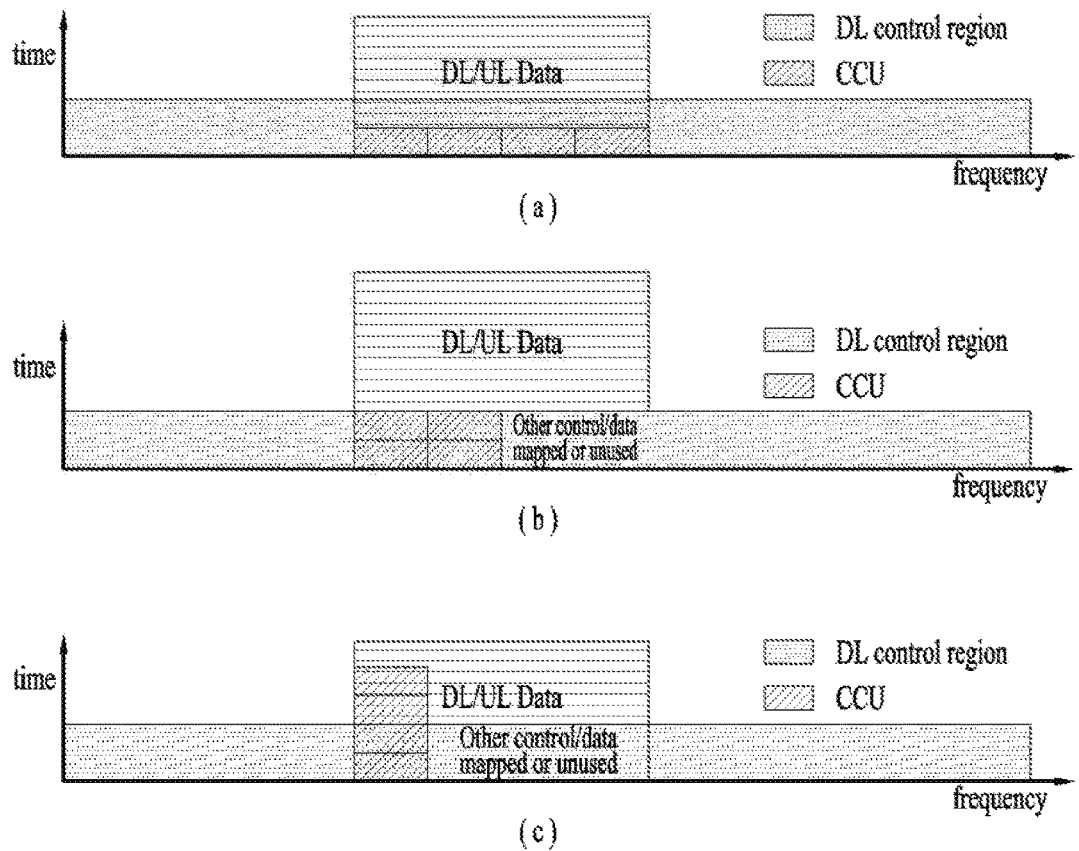
FIG. 10 illustrates examples of another control channel mapping scheme according to the present invention.

FIG. 10 illustrates examples of multiplexing of a control channel and a data channel according to the present invention. Particularly, FIG. 10 illustrates examples of multiplexing a control channel with a data channel according to the CCH mapping scheme of FIG. 9(c).

Even when a time duration predefined as a DL control region is present, a corresponding OFDM symbol may not be used for control channel transmission. The time duration predefined as the DL control region may be a value scheduled in a corresponding system by higher layer signaling and means a value which is not dynamically changed. To use the DL control region for data transmission rather than for control channel transmission, a location at which mapping of corresponding data is actually started for DL/UL data transmission on a DL control channel, i.e., an OFDM symbol number in which data mapping is started, may be indicated. A DL/UL data start timing indicated by the DL control channel is prioritized over information about a preconfigured DL control region. For example, in a situation in which the DL control channel region is preconfigured as OFDM symbols 0 to n, if the UE receives a DL control channel carrying information indicating that DL data is mapped starting from OFDM symbol n, the UE demodulates/decodes a received signal under the assumption that data is present starting from OFDM symbol n. If the information about the DL/UL data start timing is not present in the DL control channel, the UE conforms to information about a preconfigured data mapping start symbol. If the information about the DL/UL data starting timing is present in the DL control channel, the UE receives and demodulates DL/UL data starting from an indicated timing. Even when the information about the DL/UL data start timing is present in the DL control channel, if the DL/UL data is scheduled in a later subframe than a subframe in which the DL control channel is present, it is desirable to conform to advance information about an OFDM symbol number in which data mapping may be started, an OFDM symbol number allocated to the DL control region, or the number of the OFDM symbols allocated to the DL control region. For example, when the DL control channel schedules UL/DL data of a subframe in which the DL control channel is present, the UE may conform to information about a start OFDM symbol, indicated by the DL control channel, and, if the DL control channel schedules UL/DL data of a later subframe than the subframe in which the DL control channel is present, the UE may conform to a predetermined time duration. Herein, the advance information may represent information about an OFDM symbol on which data mapping is started or information about the number of OFDM symbols used as the DL control region, semi-statically provided by higher layer signaling. Alternatively, the advance information may represent information about an OFDM symbol number in which DL/UL data mapping is started or information about the number of OFDM symbols allocated to the control region, included in scheduling information in a previous subframe. In particular, in the case of the UL data, a UL grant for scheduling the UL data may indicate a timing at which mapping of the UL data is started and a timing at which mapping of the UL data is ended. It may be implicitly scheduled that mapping of the UL data is started after a guard time for DL/UL switching immediately after a symbol on which the DL control channel is present. For example, if the last OFDM symbol on which the DL control channel is present in a subframe is OFDM symbol n and the guard time for DL/UL switching is k OFDM symbols, it may be regulated that the UL data is mapped starting from the next OFDM symbol of OFDM n+k, i.e., starting from OFDM symbol n+k+1 in the subframe. Alternatively, an OFDM symbol number in which mapping of the UL data is started may be explicitly indicated to the UE. When the number of OFDM symbols on which the UL control channel is transmitted is changeable, the number of OFDM symbols on which the UL data is mapped or the last symbol number in which the UL data is present may be signaled to the UE together with the information about a UL data mapping start OFDM symbol, under the assumption that the UL control channel uses one or more OFDM symbols starting from the last symbol of a subframe. Since there is a high probability that the UL grant cannot schedule the UL data in a subframe in which the UL grant is present, it may be difficult not to accurately overlap a time region to which the UL data is actually mapped and an OFDM symbol duration in which the DL/UL control channel is present.

In FIG. 10(b) and FIG. 10(c), data or other control signals may not be mapped to a part of a DL control region and may be unused. If a DL control signal to be transmitted in the DL control region is not present, it is desirable to use a remaining region without a control signal mapped thereto for data mapping through additional signaling.

As illustrated in FIG. 10(c), when CCUs localized on the time axis are used for CCH transmission, RS overhead may be reduced but the corresponding control channel may invade up to a data region. Additional signaling is needed to indicate the case in which the control channel is allocated to a control region and even to the data region. When the control channel is transmitted in a manner illustrated in FIG. 10(c), since the control channel occupies up to the data region, an eNB may rate-match data mapped to a resource occupied by the control channel among data in a corresponding subframe and then transmit the rate-matched data. The eNB may signal rate-matching of the data to the UE. However, although rate-matching may be applied when a DL control channel schedules DL/UL data in the same subframe, it is desirable to conform to advance information about an OFDM symbol number in which data mapping may be started, an OFDM symbol number allocated to a DL control region, or the number of OFDM symbols allocated to the DL control region when the DL/UL data is scheduled in a later subframe than a subframe in which the DL control channel is present. Alternatively, although the DL/UL data of a corresponding subframe has been scheduled in a previous subframe, if the control channel in the corresponding subframe is mapped as in the scheme illustrated in FIG. 10(c), a receiving side punctures a location overlapping with the control channel among the scheduled DL/UL data in the corresponding subframe. Alternatively, the DL/UL data is transmitted/received in the corresponding subframe according to the advance information about an OFDM symbol number allocated to the DL control region or the number of OFDM symbols allocated to the DL control region.

It is noted that a part regarding the OFDM symbol location at which data mapping is started in the above description of the present invention is not always applied only to Scheme 1.

Scheme 2: Distributed CCH with Localized CCUs

A plurality of CCUs constituting one CCH is distributively mapped on the frequency axis and each CCU may be locally mapped without being distributed. Particularly, multiple CCUs constituting one CCH may be interleaved and then transmitted. Unlike Scheme 3 which will be described later, localized CCUs of Scheme 2 are configured such that mCCUs constituting each CCU are localized on the frequency axis.

Figure 11:
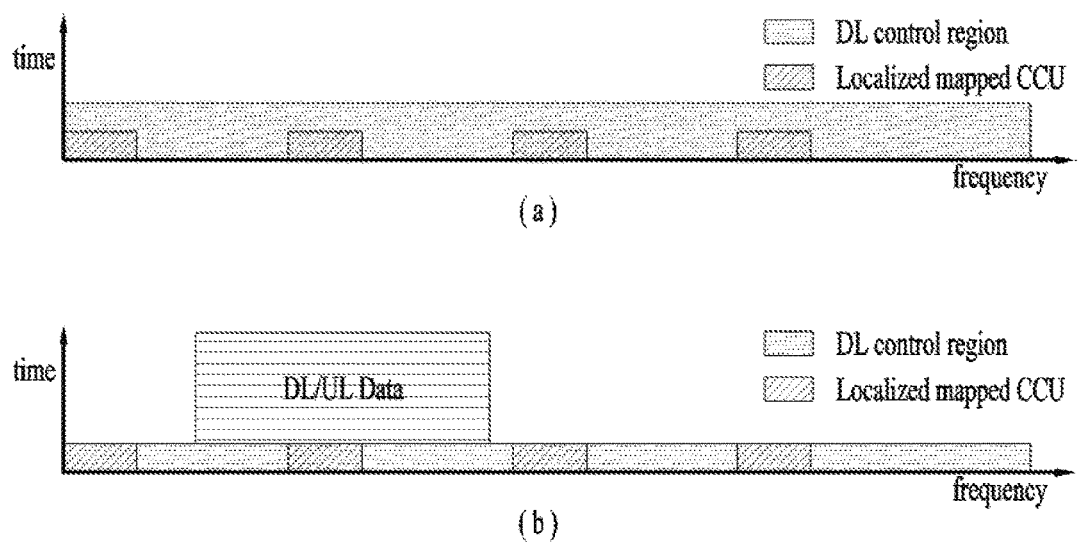
FIG. 11 illustrates examples of another control channel mapping scheme according to the present invention.

FIG. 11 illustrates examples of another control channel mapping scheme according to the present invention. Although, in FIG. 11, a plurality of CCUs is located at the same time axis, the present invention is not limited thereto.

Referring to FIG. 11, information about a band in which a CCH is transmitted and a band in which CCUs are distributed may be transmitted to the UE through broadcast information of a system, for example, information such as master information block (MIB) of LTE or information such as a system information block (SIB). According to Scheme 2, since plural CCUs are distributed along the frequency axis, frequency diversity gain may be obtained. However, when one CCH consists of one CCU, frequency diversity gain may not be obtained.

In CCH mapping of Scheme 2, a frequency band in which CCUs constituting a CCH are distributed may be defined. Information about the frequency band in which the CCUs are to distributed may be identical with respect to a plurality of grouped UEs and may be group-specifically or UE-specifically signaled. In this way, when the CCH distributed on the frequency axis is transmitted, an RS for receiving and decoding the CCH is desirably a shared RS or a common RS that may be shared between UEs of a specific group or between a plurality of UEs, rather than a UE-specific dedicated RS. When the CCH is distributed in an entire band, it is desirable to use the cell-specific RS. However, in new RAT, although a band in which the CCH is distributed is not an entire (system or channel) band, the band in which the CCH is distributed may be distributed in a relatively wide specific frequency band. The band in which the CCH is distributed may have a plurality of levels. For example, although a CCH for specific UEs is distributed only in 5 MHz, a CCH for other UEs may be distributed in 10 MHz in some cases. It is obvious that even a control channel for one UE may have different distribution levels according to type or purpose of the control channel and may be locally or distributively mapped according to specific signaling or condition.

When the CCH is distributively mapped along the frequency axis as illustrated in FIG. 11(a), the CCH may be multiplexed with a data channel, for example, as illustrated in FIG. 11(b). Referring to FIG. 11(b), a control channel for specific data may be distributively transmitted in a wider band than a data channel carrying the data.

Scheme 3: Distributed CCH with Distributed CCUs

FIG. 11 illustrates examples of another control channel mapping scheme according to the present invention.

According to Scheme 3, CCUs constituting one CCH are distributively mapped on the frequency axis in a similar manner to Scheme 2 and mCCUs constituting one CCU are also distributively mapped on the frequency axis. Information about a band in which one CCH is distributed is needed in Scheme 2, whereas the information about a band in which one CCH is distributed and information about a band in which one CCU is distributed are signaled to the UE in Scheme 3. For example, if a band in which a CCH is distributed is S1 (MHz) and a band in which one CCU is distributed is S2 (MHz), then S1≥S2. When S1=S2, a band in which mCCUs constituting the CCU can be distributed may be equal to a band in which one CCH can be distributed.

Information about a frequency band in which a CCH is distributed (hereinafter, a distributed frequency band) and/or information about a distributed frequency band of a CCU may have the same value with respect to a plurality of grouped specific UEs and may be group-specifically or UE-specifically signaled. When the CCH is distributively transmitted on the frequency axis, an RS for receiving and decoding the CCH is desirably a shared RS or a common RS that may be shared between UEs of a specific group or between a plurality of UEs rather than a UE-specific dedicated RS. If the CCH is distributed in an entire (system/channel) band, it is desirable to use the cell-specific RS. However, in new RAT, although a band in which the CCH is distributed is not the entire (system or channel) band, the band in which the CCH is distributed may be distributed in a relatively wide specific frequency band. The band in which the CCH is distributed may have a plurality of levels. That is, S1 and S2 of different values may be provided according to CCHs in one system. This means that the size of a frequency band in which the CCH may be distributed may differ according to type and characteristic of the CCH or specific condition of the CCH. Even in terms of one UE, a plurality of pairs of S1 and S2 may be provided.

S1 and S2 may be transmitted to the UE through the broadcast information of a system, for example, information such as the MIB of LTE or information such as the SIB as in Scheme 2. According to Scheme 3, since a plurality of CCUs is distributed along the frequency axis, frequency diversity gain may be obtained. In addition, even when one CCH consists of one CCU, since mCCUs constituting the CCU are distributed along the frequency axis, frequency diversity gain may be obtained.

Figure 12:
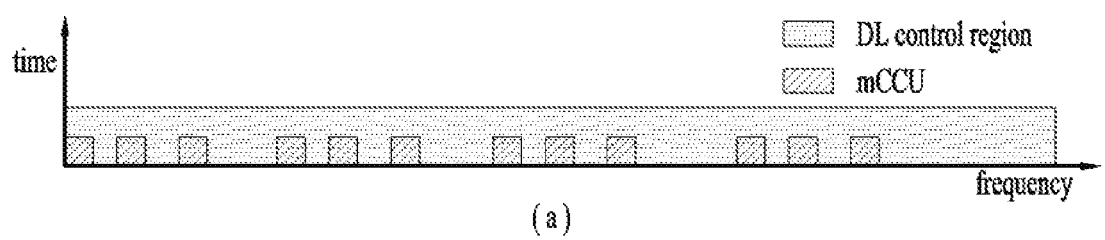
FIG. 12 illustrates the structure of a mini control channel unit (mCCU) according to the present invention.
Figure 12:
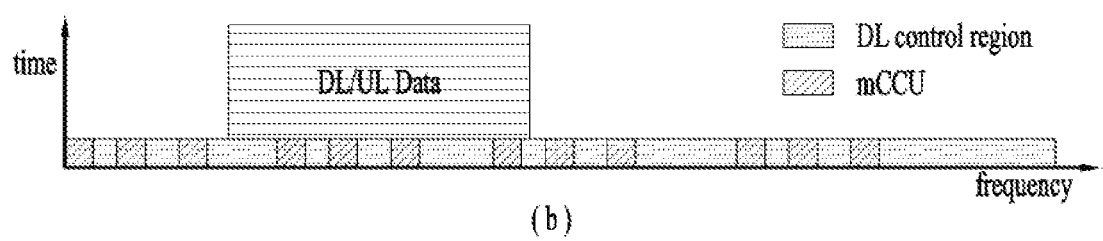

When the CCH is distributively mapped on the frequency axis as illustrated in FIG. 12(a), the CCH may be multiplexed with a data channel, for example, as illustrated in FIG. 12(b). Referring to FIG. 12(b), a control channel for specific data may be distributively transmitted in a wider band than a data channel carrying the data.

In other words, the CCH is mapped to the time-frequency region as follows according to Scheme 1, Scheme 2, and/or Scheme 3.

1) One mCCU, which is a basic RU of a CCH, may be defined as a set of concatenated REs in a localized form.

2) A plurality of mCCUs constituting one CCU may be concatenated and mapped in a localized form (Scheme 1 and Scheme 2) or may be distributively mapped (Scheme 3) in the frequency domain/axis.

2-A) When a plurality of mCCUs is distributively mapped, a distributed frequency region or a range of the distributed frequency region may differ according to a channel state of the UE receiving a corresponding CCH and a type of information transmitted through the CCH (e.g., according to whether the information is for unicast transmission to a specific UE, for multicast transmission to a plurality of UEs, or for broadcast transmission to an entire cell).

2-B) A plurality of mCCUs may be distributed in an entire system band or only in a specific subband. When the plural mCCUs are distributed only in the specific subband, the range of distributed subband(s) may vary.

3) A plurality of CCUs constituting one CCH may be concatenated and mapped in a localized form (Scheme 1) or may be distributively mapped (Scheme 2 and Scheme 3). When the CCH is mapped to a plurality of distributed CCUs, the plural CCUs may be distributed in an entire band or a subband. A distribution level of a CCU is equal to or greater than a distribution level of an mCCU. While a description has been given under the assumption that the mCCU is a set of localized REs which are concatenated, the mCCU may consist of one or more REs and the REs constituting the mCCU may be distributively mapped within a specific band. For example, when the mCCU is distributed in a specific k-MHz band, one CCU consisting of a plurality of mCCUs may be mapped to be distributed in n-MHz band, where n≥k. If the mCCU consists of one or more REs and the REs constituting the mCCU are distributively mapped within a specific band, a distribution level of the mCCU, a distribution level of the CCU, and a distribution level of the CCH may be individually designated/signaled.

<Common Control Channel Versus UE-Specific Control Channel>

As mentioned earlier, in a new RAT system in which a system band is significantly wider than a legacy 3G/4G system, it is undesirable to transmit cell-specific broadcast information in an entire band and transmit an RS for the cell-specific broadcast information in an entire band. Therefore, upon transmitting the cell-specific broadcast information to all UEs in a cell, the eNB may transmit the information in a relatively wide band although not in an entire band. Upon transmitting the information to a specific UE, the eNB may transmit the information in a narrow band or a broad band suitable for a channel situation of the UE. Therefore, the present invention proposes a scheme of group-specifically transmitting a common control channel to specific grouped UEs.

The eNB transmits a common control channel carrying common information several times in a broad band to all UEs in a cell so that the UE may receive the information. However, when analog beamforming is applied, a common control channel carrying the same or similar information should be capable of being repeatedly transmitted in every subframe due to characteristics of analog beamforming that cannot form beams of multiple directions at one timing. Since a group of target UEs and the number and locations of grouped UEs may differ according to the beamformed direction of a beam, the present invention proposes that the common control channel be repeated several times with respect to UEs grouped as a specific group. In the present invention, the meaning of "the control channel is repeated several times" represents that the control channel is transmitted to UEs of a specific group at a specific timing but the control channel is transmitted to UEs of other groups at another timing, desirably, in different beam directions.

Figure 13:
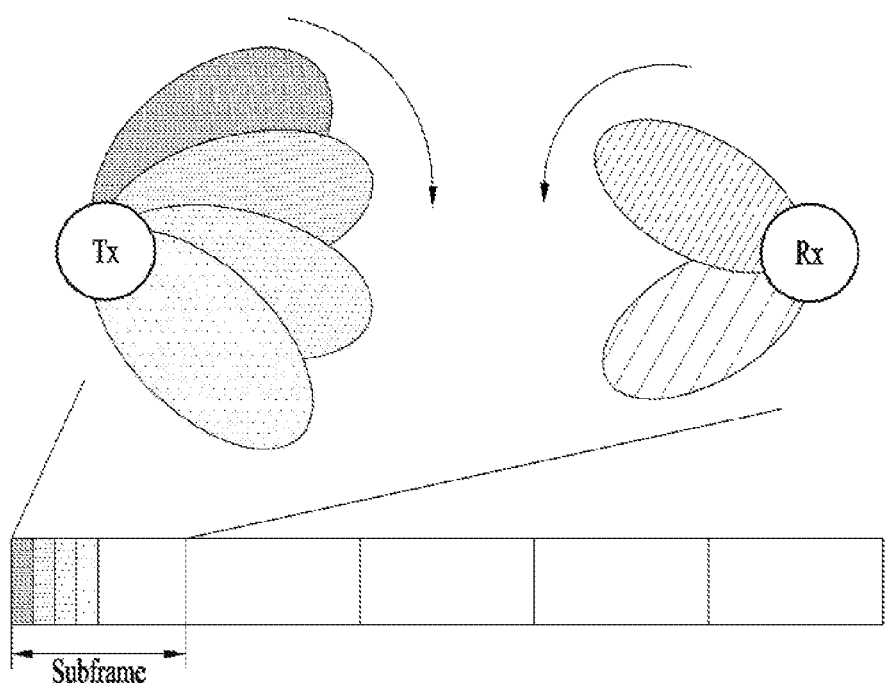
FIG. 13 illustrates an application example of analog beamforming.

FIG. 13 illustrates a transmission/reception method of a radio signal using an analog beam. Particularly, FIG. 13 illustrates a transmission/reception method of a radio signal by transmission/reception (Tx/Rx) analog beam scanning.

Referring to FIG. 13, if the eNB transmits a synchronization signal in a cell or on a carrier while switching beams, the UE performs synchronization with the cell/carrier using the synchronization signal detected in the cell/carrier and searches for a (beam) direction which is most matched therefor. Through this process, the UE should be able to acquire a cell ID and a beam ID (corresponding to the beam direction). While the UE acquires the beam ID, the UE may acquire a signal transmitted in the beam direction, particularly, RS information, for example, an RS sequence, seed information, or a location. The eNB may allocate a group ID to UEs that have acquired a specific beam ID, i.e., UEs capable of receiving a DL channel in a specific beam direction and transmit cell-common information to the UEs by being divided in time/space on a beam ID basis. The cell-common information may be transmitted to the UEs by a beam ID common scheme.

A UE that has acquired a beam ID in the cell receives cell-specific information as beam ID or group ID specific information. The beam ID or group ID specific information may be information that UEs of a corresponding group commonly receive.

<DL/UL Data Scheduling>

A DL/UL scheduling grant message should include information about a time-frequency region occupied by DL/UL data that the message schedules. Information about a symbol on which the data is started and a symbol on which the data is ended on the time axis may be transmitted together with information about a resource on the frequency axis as the scheduling message. When taking into consideration the new RAT system of a broad band, even if a control channel of the system is transmitted on a specific symbol, it cannot always guarantee that the control channel uses an entire band of the channel. As illustrated in FIG. 10, the control channel may not be transmitted in a partial frequency region of even a symbol on which DL control channel(s) are transmitted. Likewise, even when a transmitted UL control channel occupies only one or two specific symbols, if there is less UL control channel information to be transmitted, the UL control channel may not be transmitted in a specific frequency location in the specific symbol(s). To raise efficiency of resource use, the present invention proposes a scheme of using, for data transmission, a frequency region in which a control channel is not transmitted on a symbol which is allocated for the control channel. Hereinafter, a data symbol and a control symbol represent a time symbol used for data transmission and a time symbol used for control information transmission, respectively.

Figure 14:
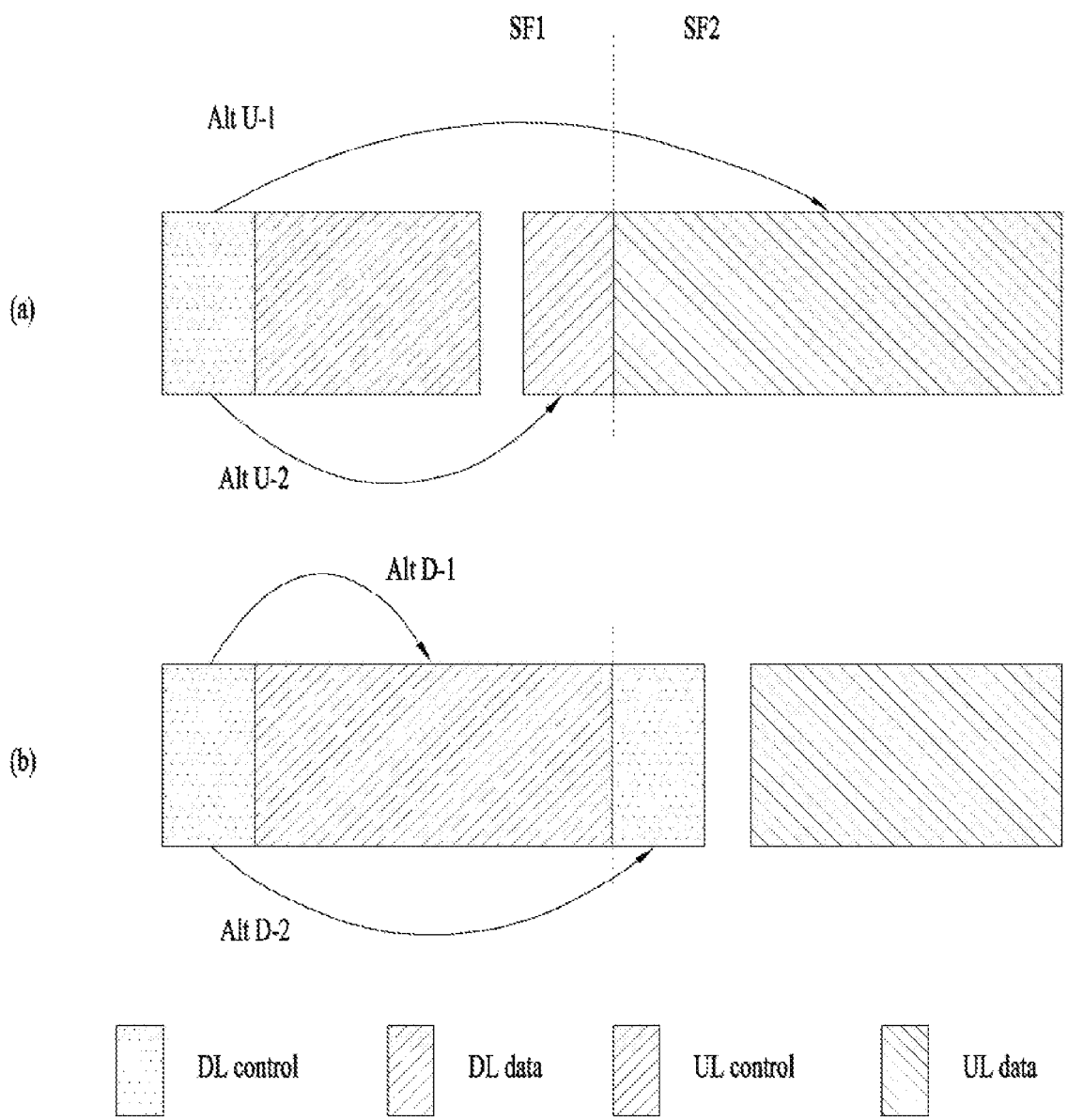
FIG. 14 illustrates UL or DL data transmission according to the present invention.

FIG. 14 illustrates UL or DL data transmission according to the present invention.

Scheme of Using a Redundant Frequency Region of UL Control Symbol for UL Data Transmission In a subframe in which a data channel and a control channel are TDMed, there is a high possibility that the data channel and the control channel are TDMed in the subframe in order of DL control information+DL/UL data+UL control information, as illustrated in FIG. 6. For example, referring to FIG. 14, when DL data is scheduled/transmitted in subframe 1 (SF1) and UL data (and UL control information) is scheduled/transmitted in subframe 2 (SF2), SF2 may be configured as a UL-only subframe in order to minimize unnecessary switching between DL and UL (hereinafter, DL/UL switching). If SF2 is configured as the UL-only subframe, scheduling for SF2 may be performed in a subframe prior to SF2, for example, in a DL control region of SF1. That is, scheduling information for UL data which is to be transmitted in SF2 may be transmitted/received in the DL control region of SF1.

A scheme of using a redundant resource of the UL control symbol of SF1 for UL data transmission may be broadly divided into two schemes. One scheme of using the redundant resource of the UL control symbol schedules UL data in SF2 using a UL grant transmitted in SF1 as in Alt U-1 illustrated in FIG. 14(a), wherein a time duration that the UL data spans may include a UL control symbol of SF1. In this case, a start timing of the UL data in SF2 may be a UL control symbol of SF1, i.e., a specific symbol of a previous subframe of SF2 and an end timing of the UL data may be the last symbol of SF2. If a time resource of the UL data includes symbols from the specific symbol of the previous subframe to the last symbol of the corresponding subframe, a scheduling unit of a time region for the UL data exceeds the number of symbols constituting one subframe. If the scheduling unit of the time region is limited to the number (N) of symbols constituting one subframe and UL data of a specific UE occupies, in SF1, symbols of a specific number (m symbols) starting from a specific symbol of a previous subframe, for example, of SF1, the last symbol that the UL data can span may be an (N−m)-th symbol of SF2.

Another scheme of using the redundant resource of the UL control symbol may perform scheduling for UL data of SF1 and scheduling for UL data of SF2 through separate DCI, as in Alt U-2 illustrated in FIG. 14(a). That is, when it is desired to schedule UL data in a designated region of SF1 as a UL control symbol, Alt U-2 may schedule the UL data on a control symbol of SF1 using an additional UL grant in SF1. Since various UL control channels will be multiplexed on the UL control symbol, the eNB may properly perform frequency division multiplexing (FDM) so as not to overlap UL control information with the UL data. When there is a remaining (frequency) resource region in the UL control symbol, the eNB may cause the UE to transmit the UL data through the UL grant on a redundant resource of the remaining (frequency) resource region on the UL control symbol. In this case, the UL grant may differ in format or content from a UL grant for normal UL data transmission (e.g., a UL grant for UL data that is to be transmitted in SF2). For example, if UL data transmission is designated in a UL control resource region/symbol through DCI, that is, if UL data multiplexed with a UL control channel on the same symbol is scheduled, a network may indicate that UL data transmission should be performed on a UL control resource linked with the DCI through a state/information for designating UL data transmission in a corresponding region. For example, a set of a resource allocation scheme and a modulation and coding scheme (MCS) for UL data transmitted on the UL control symbol may differ.

In Alt U-1, when UL data of SF2 is scheduled through one UL grant message and a time resource of the UL data includes a UL control symbol of SF1, a frequency region occupied by the UL data in SF2 may differ from a frequency region occupied by UL data in the UL control symbol of SF1. For example, the frequency region occupied by the UL data in SF2 is determined based on additional frequency resource allocation information, whereas the UL data occupied by a partial (frequency) resource of the UL control symbol in SF1 may be transmitted using a UL control resource region linked with UL grant DCI for scheduling the UL data. In this case, an indication indicating that there is a UL data transmission grant (e.g., a transmission resource) in the UL control symbol of SF1 may be signaled through the UL grant message for scheduling the UL data.

The above scheme will now be more generally described. For UL data transmission, two types of PUSCH scheduling, i.e., Type-1 PUSCH and Type-2 PUSCH, may be defined. Each of Type-1 PUSCH and Type-2 PUSCH may be differentiated to have the following characteristics. Type-1 PUSCH (called a short PUSCH) is transmitted during a relatively short time duration, whereas Type-2 PUSCH (called a long PUSCH) may be scheduled to be transmitted during a relatively long time duration. Therefore, Type-1 PUSCH occupies a relatively small number of OFDM symbols and Type-2 PUSCH occupies a relatively large number of OFDM symbols. Type-1 PUSCH may be designed for the purpose of transmitting UL data in symbol (s) allocated as a UL control channel transmission region (through a remaining (frequency) resource unused for UL control channel transmission) in order to raise efficiency of resource use. Accordingly, Type-1 PUSCH may be larger than Type-2 PUSCH in a value of a symbol index in which UL data transmission is started in the same subframe. Since Type-1 PUSCH occupies a short time duration (an encoding time may also be shortened), Type-1 PUSCH may be shorter than Type-2 PUSCH in HARQ timing delay, i.e., a time interval between UL grant DCI reception and UL data transmission corresponding thereto. Due to a characteristic in which a time length occupied by Type-1 PUSCH on the time axis is short, Type-1 PUSCH may be smaller than Type-2 PUSCH in a maximum transport block (TB) size through a corresponding channel. Type-1 PUSCH may differ from Type-2 PUSCH in scheduling granularity of a frequency resource allocated for UL data transmission, i.e., in a minimum unit of frequency resource allocation. Even if Type-1 PUSCH and Type-2 PUSCH transmit the same TB, the number of REs on the frequency axis of an RB for transmitting Type-1 PUSCH may be larger than the number of REs in frequency axis of an RB for transmitting Type-2 PUSCH or Type-1 PUSCH may be set to be larger than Type-2 PUSCH in the size of a resource block group (RBG), which is the minimum unit of frequency resource allocation, in a state in which the number of REs per RB is equal.

In addition, a DCI format and/or configuration for scheduling Type-1 PUSCH may be slightly different from a DCI format and/or configuration for scheduling Type-2 PUSCH. Type-2 PUSCH may be scheduled by a UL grant DCI format. Type-1 PUSCH may also be scheduled by the UL grant DCI format and may be scheduled using a partial field of a DL grant DCI format or the UL grant DCI format. Scheduling using a partial field of the DL grant DCI format means that DL data (PDSCH) scheduling and UL Type-1 PUSCH scheduling may be simultaneously performed by one DL grant DCI. Scheduling using a partial field of the UL grant DCI format means that Type-2 PUSCH scheduling and Type-1 PUSCH scheduling may be simultaneously performed by one UL grant DCI. However, in the case of Type-1 PUSCH (as opposed to the case of normal Type-2 PUSCH), compact scheduling may be performed using only a partial field of the DL grant DCI or the UL grant DCI. In other words, two types of data scheduling may be performed for the UE by one DCI. For example, (when a partial field of the UL grant DCI is used,) two types of PUSCHs may be scheduled for the UE by one DCI or, (when a partial field of the DL grant DCI is used,) scheduling information for DL data and scheduling information for UL data are simultaneously provided to the UE by one DCI. When the eNB desires to simultaneously schedule Type-1 PUSCH and Type-2 PUSCH with respect to one UE, scheduling may be performed by the above scheme for the purpose of reducing DCI overhead and the PUSCHs may be TDMed or FDMed in one subframe, one slot, or different slots. That is, the UE may receive scheduling information about data having different attributes in a data allocation unit, an MCS, or a HARQ process ID through one DCI. When Type-1 PUSCH is scheduled through a partial field of the DL grant DCI, UL data and DL data may be scheduled for the UE through one DCI.

Type-1 PUSCH inevitably imposes restrictions on scheduling relative to Type-2 PUSCH. For example, since a maximum TB size (TBS), an MCS, and an occupied symbol duration are restricted, combinations of PUSCH scheduling information for Type-1 PUSCH transmission may be preconfigured for the UE through radio resource control (RRC) signaling and Type-1 PUSCH transmission may be scheduled by a scheme of indicating one specific combination of the combinations through the DCI. Herein, the combinations of the PUSCH scheduling information may include the following information: MCS/TBS information, RB allocation information, PUSCH symbol duration information (e.g., start/last symbol index), a HARQ process ID, and the like.

Characteristics of Type-1 PUSCH and Type-2 PUSCH are summarized as follows.

1) Start symbol index: Type-1 PUSCH>Type-2 PUSCH.
2) (Maximum) number of occupied symbols: Type-1 PUSCH<Type-2 PUSCH.
3) Minimum unit of frequency resource allocation: Type-1 PUSCH>Type-2 PUSCH.
4) Maximum TBS: Type-1 PUSCH<Type-2 PUSCH.
5) PUSCH transmission delay: Type-1 PUSCH<Type-2 PUSCH.

Meanwhile, a slot or subframe (SF) of new RAT (NR) may have the structure of 'DL control region+DL/UL data region+UL control region' as illustrated in FIG. 6. In this case, the following SF types may be present.

>SF Type 1: DL control+DL data+UL control;
>SF Type 2: DL control+UL data+UL control;
>SF Type 3: DL control+DL data;
>SF Type 4: DL control+UL data;
>SF Type 5: DL data+UL control;
>SF Type 6: UL data+UL control;
>SF Type 7: DL data only; and/or
>SF Type 8: UL data only.

Type-1 PUSCH and Type-2 PUSCH scheduled and multiplexed in a slot or an SF may have the following characteristics. Type-1 PUSCH may be scheduled/transmitted in the form of being FDMed with the UL control channel in the SF types.

>Type-1 PUSCH may be transmitted in an SF type with a DL data resource (e.g., SF Type 1/5) and Type-2 PUSCH may be transmitted in an SF type without the DL data resource (e.g., SF Type 2/4/6/8).

>Type-1 PUSCH may be transmitted regardless of whether a DL data resource duration is present in an SF (e.g., through SF Type 1/2/5/6), whereas Type-2 PUSCH may be transmitted only in an SF without the DL data resource duration (e.g., SF Type 2/4/6/8).

>Type-1 PUSCH and Type-2 PUSCH may be transmitted in the form of being TDMed in the same SF (e.g., SF Type 2/6) and Type-2 PUSCH may be transmitted on a faster symbol in time than Type-1 PUSCH.

Scheme of Using Redundant Frequency Region of DL Control Symbol for DL Data Transmission In a similar manner to the afore-described scheme of using a partial (frequency) region in the UL control symbol for UL data transmission, a partial (frequency) region of the DL control symbol may be used for DL data transmission. For DL data scheduled in SF1, a DL control region of SF1 may be used for DL data transmission and a DL control region of SF2 subsequent to SF1 may be used for DL data transmission. In Alt D-1 illustrated in FIG. 14(b), DL data is scheduled using a DL grant transmitted in SF1 and, when needed, a DL control symbol of SF2 as well as a DL control symbol of SF1 may be used for DL data transmission. For example, a time duration that DL data spans, i.e., a time duration from a start symbol to an end symbol, used for DL data transmission, may be explicitly indicated by the DL grant. Alternatively, a start timing of the DL data and the number of symbols occupied by the DL data may be indicated by the DL grant. In this case, a symbol on which the DL data is started may include the first symbol of SF1 and a symbol on which the DL data is ended may include a DL control symbol of SF2. As another scheme, in Alt D-2 illustrated in FIG. 14(b), the DL control symbol of SF2 is used for DL data transmission and a DL grant for separately scheduling, in SF1, only the DL control region of SF2 is transmitted.

Similarly to the case of UL, when the DL data is scheduled in a DL control region, the DL data needs to be properly multiplexed with other PDCCHs in the DL control region.

When the DL data is transmitted in the DL control region, since various DL control channels are transmitted/received in the DL control region, it is desirable that an RU of the DL data be an integer multiple of an RU of the DL control channel in order to efficiently multiplex the DL data with other DL control channels in the frequency domain. When the DL data is scheduled on a partial resource of the DL control symbol, a unit of a scheduling resource may differ from a unit for scheduling the DL data in the DL data region. Accordingly, when the DL data is scheduled on a partial resource of the DL control symbol, the DL data may be scheduled using a unit of the DL control channel, for example, using a CCU index of a CCH. A CCU index of SF2, which is the same as a CCU index used for DCI transmission in SF1 or which is linked to a CCU index used for DCI transmission in SF1, may be allocated for DL data transmission. In this case, for DL scheduling of the scheme of Alt D-2, a DL control symbol of SF2 or SF1 may be used for DL data transmission through an additional state/indicator/information field in a DL grant message for scheduling DL data as in the scheme of Alt D-1 rather than transmitting an additional DL grant.

The above scheme will now be more generally described. Similarly to UL, two types of PDSCH scheduling, i.e., Type-1 PDSCH and Type-2 PDSCH, may be defined for DL data transmission. Each of Type-1 PDSCH and Type-2 PDSCH may be differentiated to have the following characteristics. Type-1 PDSCH (called a short PDSCH) is transmitted during a relatively short time duration, whereas Type-2 PDSCH (called a long PDSCH) may be scheduled to be transmitted during a relatively long time duration. Therefore, Type-1 PDSCH occupies a relatively small number of OFDM symbols and Type-2 PDSCH occupies a relatively large number of OFDM symbols. Type-1 PDSCH may be designed for the purpose of transmitting DL data in symbol(s) allocated as a DL control channel transmission region (through a remaining (frequency) resource unused for DL control channel transmission) in order to raise efficiency of resource use. Accordingly, Type-1 PDSCH may be smaller than Type-2 PDSCH in a value of a symbol index in which DL data transmission is started in the same subframe. Since Type-1 PDSCH occupies a short time duration (an encoding time may also be shortened), Type-1 PDSCH may be set to be shorter than Type-2 PDSCH in HARQ timing delay, i.e., a time interval between DL grant DCI reception and DL data transmission corresponding thereto. Due to a characteristic in which a time length occupied by Type-1 PDSCH on the time axis is short, Type-1 PDSCH may be smaller than Type-2 PDSCH in a maximum TBS through a corresponding channel. Type-1 PDSCH may differ from Type-2 PDSCH in scheduling granularity of a frequency resource allocated for DL data transmission, i.e., in a minimum unit of frequency resource allocation. Even if Type-1 PDSCH and Type-2 PDSCH transmit the same TB, the number of REs on the frequency axis of an RB for transmitting Type-1 PDSCH may be larger than the number of REs in frequency axis of an RB for transmitting Type-2 PDSCH or Type-1 PDSCH may be set to be larger than Type-2 PDSCH in the size of an RBG, which is the minimum unit of frequency resource allocation, in a state in which the number of REs per RB is equal.

A DCI format and/or configuration for scheduling Type-1 PDSCH may be slightly different from a DCI format and/or configuration for scheduling Type-2 PDSCH. Type-2 PDSCH may be scheduled by a DL grant DCI format. Type-1 PDSCH may also be scheduled by the DL grant DCI format and may be scheduled using a partial field of the DL grant DCI format or a UL grant DCI format. Scheduling using a partial field of the DL grant DCI format means that DL Type-2 PDSCH scheduling and Type-1 PDSCH scheduling may be simultaneously performed by one DL grant DCI. Scheduling using a partial field of the UL grant DCI format means that Type-2 PUSCH scheduling and Type-1 PDSCH scheduling may be simultaneously performed by one UL grant DCI. However, in the case of Type-1 PDSCH (as opposed to the case of normal Type-2 PDSCH), compact scheduling may be performed using only a partial field of the DL grant DCI or the UL grant DCI. In other words, two types of data scheduling may be performed for the UE by one DCI. Two types of PDSCHs may be scheduled for the DE by one DCI or scheduling for DL data and scheduling for UL data may be simultaneously performed by one DCI. When the eNB desires to simultaneously schedule Type-1 PDSCH and Type-2 PDSCH with respect to one UE, scheduling may be performed by the above scheme for the purpose of reducing DCI overhead and the PDSCHs may be TDMed or FDMed in one subframe, one slot, or different slots. That is, the UE may receive scheduling information about data having different attributes in a data allocation unit, an MCS, or a HARQ process ID through one DCI. When Type-1 PDSCH is scheduled through a partial field of the UL grant DCI, UL data and DL data may be scheduled for the UE through one DCI. That is, the UL grant is transmitted through one DCI, Type-1 PDSCH may be scheduled using a partial field of the DCI. In this case, scheduling information for Type-1 PDSCH may be present or absent in the DCI.

Type-1 PDSCH inevitably imposes restrictions on scheduling relative to Type-2 PDSCH. For example, since a maximum TBS, an MCS, and an occupied symbol duration are restricted, a set of combinations of PDSCH scheduling information for Type-1 PDSCH transmission may be pre-configured for the UE through RRC signaling. Type-1 PDSCH may be scheduled by a scheme of indicating a specific combination of the combinations in the set through the DCI. Herein, the combinations of the PDSCH scheduling information may include the following information: MCS/TBS information, RB allocation information, PUSCH symbol duration information (e.g., start/last symbol index), a HARQ process ID, and the like.

Characteristics of Type-1 PDSCH and Type-2 PDSCH are summarized as follows.

1) Start symbol index: Type-1 PDSCH<Type-2 PDSCH.
2) (Maximum) number of occupied symbols: Type-1 PDSCH<Type-2 PDSCH.
3) Length of the frequency axis of RB for scheduling (number of REs in frequency axis): Type-1 PDSCH>Type-2 PDSCH.
4) Maximum TBS: Type-1 PDSCH<Type-2 PDSCH.
5) PUSCH transmission delay: Type-1 PDSCH<Type-2 PDSCH.

Meanwhile, a slot or an SF of NR may have the structure of 'DL control region+DL/UL data region+UL control region' as illustrated in FIG. 6. In this case, the following SF types may be present:
>SF Type 1: DL control+DL data+UL control;
>SF Type 2: DL control+UL data+UL control;
>SF Type 3: DL control+DL data;
>SF Type 4: DL control+UL data;
>SF Type 5: DL data+UL control;
>SF Type 6: UL data+UL control;
>SF Type 7: DL data only; and/or
>SF Type 8: UL data only.

Type-1 PDSCH and Type-2 PDSCH scheduled and multiplexed in a slot or an SF may have the following characteristics. Type-1 PDSCH may be scheduled/transmitted in the form of being FDMed with the DL control channel in the SF types.
>Type-1 PDSCH may be transmitted in an SF type with a UL data resource (e.g., SF Type 2/4) and Type-2 PDSCH may be transmitted in an SF type without the UL data resource (e.g., SF Type 1/3/5/7).
>Type-1 PDSCH may be transmitted regardless of whether a UL data resource duration is present in an SF (e.g., through SF Type 1/2/3/4), whereas Type-2 PDSCH may be transmitted only in an SF without the UL data resource duration (e.g., SF type 1/3/5/7).
>Type-1 PDSCH and Type-2 PDSCH may be transmitted in the form of being TDMed in the same SF (e.g., SF type 1/3) and Type-2 PDSCH may be transmitted on a faster symbol in time than Type-1 PDSCH.

Figure 15:
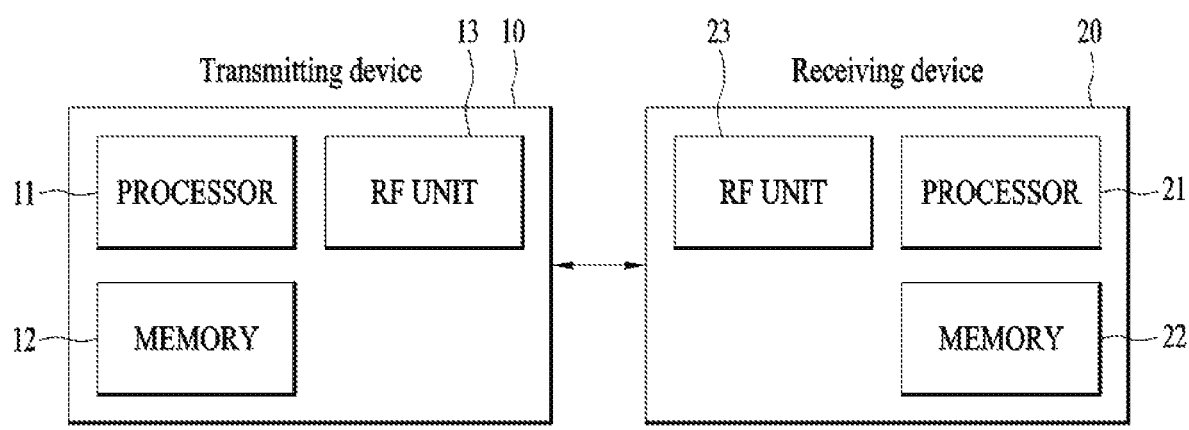
FIG. 15 is a block diagram illustrating elements of a transmitting device 10 and a receiving device 20 for implementing the present invention.

FIG. 15 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described examples of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the examples of the present invention, a UE operates as the transmitting device 10 in UL and as the receiving device 20 in DL. In the examples of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The eNB processor of the present invention may allocate DL/UL data according to any one of the proposals of the present invention. For example, the eNB processor may allocate the DL/UL data to subframes according to Alt U-1, Alt U-2, Alt D-1, or Alt D-2 described with reference to FIG.

14 and control the eNB RF unit to transmit scheduling information for the DL/UL data. The eNB processor may control the eNB RF unit to transmit the DL data or receive the UL data in subframes according to the scheduling information.

The UE processor of the present invention may receive allocation information of the DL/UL data according to any one of the proposals of the present invention. For example, the UE processor may control the UE RF unit to receive the scheduling information for the DL/UL data scheduled in subframes according to Alt U-1, Alt U-2, Alt D-1, or Alt D-2 described with reference to FIG. 14. The UE processor may control the UE RF unit to receive the DL data or transmit the UL data in subframes according to the scheduling information.

As described above, the detailed description of the preferred examples of the present invention has been given to enable those skilled in the art to implement and practice the invention. Although the invention has been described with reference to examples, those skilled in the art will appreciate that various modifications and variations can be made in the present invention without departing from the spirit or scope of the invention described in the appended claims. Accordingly, the invention should not be limited to the specific examples described herein, but should be accorded the broadest scope consistent with the principles and novel features disclosed herein.

INDUSTRIAL APPLICABILITY

The examples of the present invention are applicable to a BS, a UE, or other devices in a wireless communication system.

What is claimed is:

1. A method of receiving a downlink (DL) signal by a user equipment (UE), the method comprising:
   receiving first DL scheduling information for a first time interval and second DL scheduling information for a second time interval in the first time interval; and
   receiving a first type DL data channel in the first time interval according to the first DL scheduling information and receiving a second type DL data channel in the second time interval according to the second DL scheduling information,
   wherein each of the first time interval and the second time interval includes a DL control region and a data region in a time domain,
   the first DL scheduling information and the second DL scheduling information are received in the DL control region of the first time interval,
   the first type DL data channel is received in the data region of the first time interval,
   the second type DL data channel is received in the DL control region of the second time interval, and
   the data region of the first time interval and the DL control region of the second time interval are consecutive, and
   wherein the first DL scheduling information indicates a resource for the first type DL data channel as an integer multiple of a data resource allocation unit and the second DL scheduling information represents a resource for the second type DL data channel as an integer multiple of a DL control channel allocation unit.

2. The method of claim 1, wherein the first DL scheduling information and the second DL scheduling information are received in one DL grant message.

3. The method of claim 1, wherein the second type DL data channel occupies fewer time symbols than that of the first type DL data channel, occupies a longer frequency length in a frequency domain than that of the first type DL data channel, carries a smaller transport block size than that of the first type DL data channel, or has shorter transmission delay than that of the first type DL data channel.

4. The method of claim 1, further comprising:
   receiving first UL scheduling information for a third time interval and second UL scheduling information for a fourth time interval in the third time interval; and
   transmitting a first type UL data channel in the third time interval according to the first UL scheduling information and transmitting a second type UL data channel in the fourth time interval according to the second UL scheduling information,
   wherein the third time interval includes a DL control region, a data region, and a UL control region in the time domain and the fourth time interval includes a data region in the time domain,
   the first UL scheduling information and the second UL scheduling information are received in the DL control region of the third time interval,
   the first type UL data channel is transmitted in the UL control region of the third time interval,
   the second type UL data channel is transmitted in the data region of the fourth time interval, and
   the UL control region of the third time interval and the data region of the fourth time interval are consecutive.

5. The method of claim 4, wherein the first type UL data channel occupies fewer time symbols than that of the second type UL data channel, occupies a longer frequency length in a frequency domain than that of the second type UL data channel, carries a smaller transport block size than that of the second type UL data channel, or has shorter transmission delay than that of the second type UL data channel.

6. A user equipment (UE) for receiving a downlink (DL) signal, the UE comprising:
   a radio frequency (RF) transceiver, and
   a processor configured to control the RF transceiver,
   wherein the processor:
   controls the RF transceiver to receive first DL scheduling information for a first time interval and second DL scheduling information for a second time interval in the first time interval; and
   controls the RF transceiver to receive a first type DL data channel in the first time interval according to the first DL scheduling information and receive a second type DL data channel in the second time interval according to the second DL scheduling information,
   wherein each of the first time interval and the second time interval includes a DL control region and a data region in a time domain,
   wherein the processor controls the RF transceiver to receive the first DL scheduling information and the second DL scheduling information in the DL control region of the first time interval, controls the RF transceiver to receive the first type DL data channel in the data region of the first time interval, and controls the RF transceiver to receive the second type DL data channel in the DL control region of the second time interval,
   wherein the data region of the first time interval and the DL control region of the second time interval are consecutive, and
   wherein the first DL scheduling information indicates a resource for the first type DL data channel as an integer multiple of a data resource allocation unit and the second DL scheduling information represents a resource for the second type DL data channel as an integer multiple of a DL control channel allocation unit.

7. The UE of claim 6, wherein the first DL scheduling information and the second DL scheduling information are received in one DL grant message.

8. The UE of claim 6, wherein the second type DL data channel occupies fewer time symbols than that of the first type DL data channel, occupies a longer frequency length in a frequency domain than that of the first type DL data channel, carries a smaller transport block size than that of the first type DL data channel, or has shorter transmission delay than that of the first type DL data channel.

9. The UE of claim 6,
wherein the processor:
controls the RF transceiver to receive first UL scheduling information for a third time interval and second UL scheduling information for a fourth time interval in the third time interval; and
control the RF transceiver to transmit a first type UL data channel in the third time interval according to the first UL scheduling information and transmit a second type UL data channel in the fourth time interval according to the second UL scheduling information,
wherein the third time interval includes a DL control region, a data region, and a UL control region in the time domain and the fourth time interval includes a data region in the time domain,
wherein the processor controls the RF transceiver to receive the first UL scheduling information and the second UL scheduling information in the DL control region of the third time interval, controls the RF transceiver to transmit the first type UL data channel in the UL control region of the third time interval, and controls the RF transceiver to transmit the second type UL data channel in the data region of the fourth time interval, and
wherein the UL control region of the third time interval and the data region of the fourth time interval are consecutive.

10. The UE of claim 9, wherein the first type UL data channel occupies fewer time symbols than that of the second type UL data channel, occupies a longer frequency length in a frequency domain than that of the second type UL data channel, carries a smaller transport block size than that of the second type UL data channel, or has shorter transmission delay than that of the second type UL data channel.

11. A method of transmitting a downlink (DL) signal by a base station (BS), the method comprising:
transmitting first DL scheduling information for a first time interval and second DL scheduling information for a second time interval in the first time interval; and
transmitting a first type DL data channel in the first time interval according to the first DL scheduling information and transmitting a second type DL data channel in the second time interval according to the second DL scheduling information,
wherein each of the first time interval and the second time interval includes a DL control region and a data region in a time domain,
the first DL scheduling information and the second DL scheduling information are transmitted in the DL control region of the first time interval,
the first type DL data channel is transmitted in the data region of the first time interval,
the second type DL data channel is transmitted in the DL control region of the second time interval,
the data region of the first time interval and the DL control region of the second time interval are consecutive, and
wherein the first DL scheduling information indicates a resource for the first type DL data channel as an integer multiple of a data resource allocation unit and the second DL scheduling information represents a resource for the second type DL data channel as an integer multiple of a DL control channel allocation unit.

12. A base station (BS) for transmitting a downlink (DL) signal, the BS comprising:
a radio frequency (RF) transceiver, and
a processor configured to control the RF transceiver,
wherein the processor:
controls the RF transceiver to transmit first DL scheduling information for a first time interval and second DL scheduling information for a second time interval in the first time interval; and
controls the RF transceiver to transmit a first type DL data channel in the first time interval according to the first DL scheduling information and transmit a second type DL data channel in the second time interval according to the second DL scheduling information,
wherein each of the first time interval and the second time interval includes a DL control region and a data region in a time domain,
the first DL scheduling information and the second DL scheduling information are transmitted in the DL control region of the first time interval,
the first type DL data channel is transmitted in the data region of the first time interval,
the second type DL data channel is transmitted in the DL control region of the second time interval,
the data region of the first time interval and the DL control region of the second time interval are consecutive, and
wherein the first DL scheduling information indicates a resource for the first type DL data channel as an integer multiple of a data resource allocation unit and the second DL scheduling information represents a resource for the second type DL data channel as an integer multiple of a DL control channel allocation unit.

\* \* \* \* \*